US012060731B2

(12) United States Patent
Jones et al.

(10) Patent No.: US 12,060,731 B2
(45) Date of Patent: Aug. 13, 2024

(54) LOCKING MECHANISM

(71) Applicant: Latch, Inc., New York, NY (US)

(72) Inventors: Michael Brian Jones, New York, NY (US); Luke Andrew Schoenfelder, New York, NY (US); Sarah Margaret Plis, New York, NY (US); John Thomas Jacobsen, New York, NY (US); Euan Scott Foster Abraham, San Francisco, CA (US); Sage Wright, Brooklyn, NY (US); Michael Farid Jaja, Brooklyn, NY (US)

(73) Assignee: Latch Systems, Inc., New York, NY (US)

( * ) Notice: Subject to any disclaimer, the term of this patent is extended or adjusted under 35 U.S.C. 154(b) by 667 days.

(21) Appl. No.: 17/145,922

(22) Filed: Jan. 11, 2021

(65) Prior Publication Data

US 2021/0222458 A1 Jul. 22, 2021

Related U.S. Application Data

(60) Provisional application No. 62/963,969, filed on Jan. 21, 2020.

(51) Int. Cl.
*E05B 47/00* (2006.01)
*E05B 47/06* (2006.01)
(Continued)

(52) U.S. Cl.
CPC ........ *E05B 47/0012* (2013.01); *E05B 47/068* (2013.01); *E05B 63/04* (2013.01); (Continued)

(58) Field of Classification Search
CPC ......... E05B 2047/0026; E05B 63/0056; E05B 63/04; E05B 47/0012; E05B 47/068; E05B 2047/0094; E05B 2047/0095
See application file for complete search history.

(56) References Cited

U.S. PATENT DOCUMENTS 190,261 A * 5/1877 Sutherland ................ E05B 3/06 292/348
5,233,851 A * 8/1993 Florian .................. E05B 9/084 70/369
(Continued)

FOREIGN PATENT DOCUMENTS

EP 1113130 A1 * 7/2001 .......... E05B 47/068
EP 1113130 A1 7/2001
(Continued)

OTHER PUBLICATIONS

Machine translation of KR 101912381 B1 (Year: 2017).*
(Continued)

*Primary Examiner* — Christine M Mills
*Assistant Examiner* — Peter H Watson
(74) *Attorney, Agent, or Firm* — KDW Firm PLLC

(57) ABSTRACT

Locking mechanisms and methods of operating the locking mechanisms are disclosed. In one example, a locking mechanism may include a main hub assembly coupleable with a deadbolt, a clutch assembly coupled to the main hub assembly, and an actuator assembly coupled to the clutch assembly. The actuator assembly may include an actuator operable to bias a carriage along a first direction to bring the clutch assembly and the main hub assembly closer to one another along a second direction, wherein the second direction is perpendicular to the first direction. The locking mechanism may further include a thumbturn assembly coupled to the clutch assembly, the thumbturn assembly comprising a thumbturn positionable on an exterior side of a door.

20 Claims, 32 Drawing Sheets

(51) Int. Cl.
*E05B 63/00* (2006.01)
*E05B 63/04* (2006.01)
*G07C 9/00* (2020.01)

(52) U.S. Cl.
CPC ........ *G07C 9/00* (2013.01); *E05B 2047/0026* (2013.01); *E05B 2047/0095* (2013.01); *E05B 63/0056* (2013.01)

(56) References Cited

U.S. PATENT DOCUMENTS

2005/0050928 A1* 3/2005 Frolov .................. E05B 47/068 70/277
2010/0212373 A1* 8/2010 Wheeler ............. E05B 17/0058 70/91
2017/0298651 A1* 10/2017 Ma ...................... E05B 63/0056
2017/0306646 A1 10/2017 Guo et al.
2019/0390478 A1* 12/2019 Xiang ..................... E05B 15/04
2021/0174620 A1* 6/2021 Kusanale ............ E05B 47/0012

FOREIGN PATENT DOCUMENTS

EP 1803875 A2 * 7/2007 ........... E05B 13/106
KR 101555035 B1 * 5/2014 ......... E05B 47/0012
KR 101912381 B1 * 8/2017 ........... E05B 47/068
WO WO-2011071330 A2 * 6/2011 ......... E05B 47/0692
WO WO-2012015135 A1 * 2/2012 ......... E05B 47/0642

OTHER PUBLICATIONS

Machine translation of KR 101555035 B1 (Year: 2014).*
Machine translation of WO-2011071330-A2 (Year: 2011).*
Machine translation of WO-2012015135-A1 (Year: 2012).*
European Search Report and Written Opinion for the European Patent Application No. 21179886, mailed Dec. 16, 2021, 6 pages.

* cited by examiner

LOCKING MECHANISM

CROSS-REFERENCE TO RELATED APPLICATIONS

This application claims the benefit of the filing date of U.S. Provisional Application Ser. No. 62/963,969, filed Jan. 21, 2020, the entire contents of which is incorporated herein by reference.

TECHNICAL FIELD

Embodiments of the present disclosure generally relate to door locking mechanisms. More particularly, embodiments of the present disclosure relate to door locking mechanisms including an actuator enabled clutch assembly.

BACKGROUND

Access control systems may include a reader, an access control panel, and an electronic door activating hardware device. The readers receive credentials from users and transmit the received credentials to the access control panel. The access control panel stores a preset list of authorized credentials and checks the information passed from the reader against the preset list of authorized credentials to determine whether that user is authorized to perform its desired action, e.g., access to a restricted area. If it is determined that the user is authorized to access the restricted area, the access control panel can unlock the electronic door activating hardware.

In some systems, the electronic door activating hardware includes a deadbolt assembly. For example, a keyed deadbolt assembly is used to supplement the level of security provided by a simple keyed lock configured integral with a doorknob or handle. A traditional deadbolt assembly may include an exterior keyed lock cylinder and a cylinder body that projects away from the surface of a standard door. The lock cylinder has a tailpiece that is operably connected to a deadbolt actuation mechanism to facilitate retraction and extension of the deadbolt. An interior turn piece is provided on the interior side of the door, and also is operably connected to the deadbolt actuation mechanism.

Numerous examples exist of electronic deadbolts, which may utilize motorized retraction of the deadbolt. However, such electronic deadbolts are power (e.g., battery) intensive, and lack manual options for projecting the deadbolt from an exterior of the door without the use of a physical key, smartphone, key fob, etc. It is with respect to this and other considerations that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one approach of the disclosure, a locking mechanism may include a main hub assembly coupleable with a deadbolt, a clutch assembly coupled to the main hub assembly, and an actuator assembly coupled to the clutch assembly, the actuator assembly comprising an actuator operable to bias a carriage along a first direction to bring the clutch assembly and the main hub assembly closer to one another along a second direction, wherein the second direction is perpendicular to the first direction. The locking mechanism may further include a thumbturn assembly coupled to the clutch assembly, the thumbturn assembly comprising a thumbturn positionable on an exterior side of a door.

In another approach of the disclosure, a method of operating a locking mechanism may include providing a main hub assembly comprising a tailpiece, wherein the tailpiece is coupleable with a deadbolt, and coupling a clutch assembly to the main hub assembly. The method may further include receiving, at an actuator assembly, a signal indicating receipt of a valid credential, wherein the actuator assembly comprises an actuator operable with a carriage, and biasing, in response to the signal, the carriage along a first direction to bring the clutch assembly and the main hub assembly closer to one another along a second direction, wherein the second direction is perpendicular to the first direction.

In yet another approach of the disclosure, a locking mechanism may include a main hub assembly coupled to a housing, the main hub assembly including a tailpiece coupleable with a deadbolt, and a clutch assembly coupled to the main hub assembly. The locking mechanism may further include an actuator assembly coupled to the clutch assembly, the actuator assembly comprising an actuator operable to bias a carriage along a first direction in response to a signal to a wireless communications module within the housing indicating a valid credential has been received, wherein biasing the carriage along the first direction causes the carriage to move between first and second ends of a channel of the clutch assembly to bring the clutch assembly and the main hub assembly closer to one another along a second direction, and wherein the second direction is perpendicular to the first direction. The locking mechanism may further include a thumbturn assembly coupled to the clutch assembly, the thumbturn assembly comprising a thumbturn positionable on an exterior side of a door.

BRIEF DESCRIPTION OF THE DRAWINGS

In the drawings, like reference characters generally refer to the same parts throughout the different views. In the following description, various embodiments of the present disclosure are described with reference to the following drawings, in which.

Figure 1:
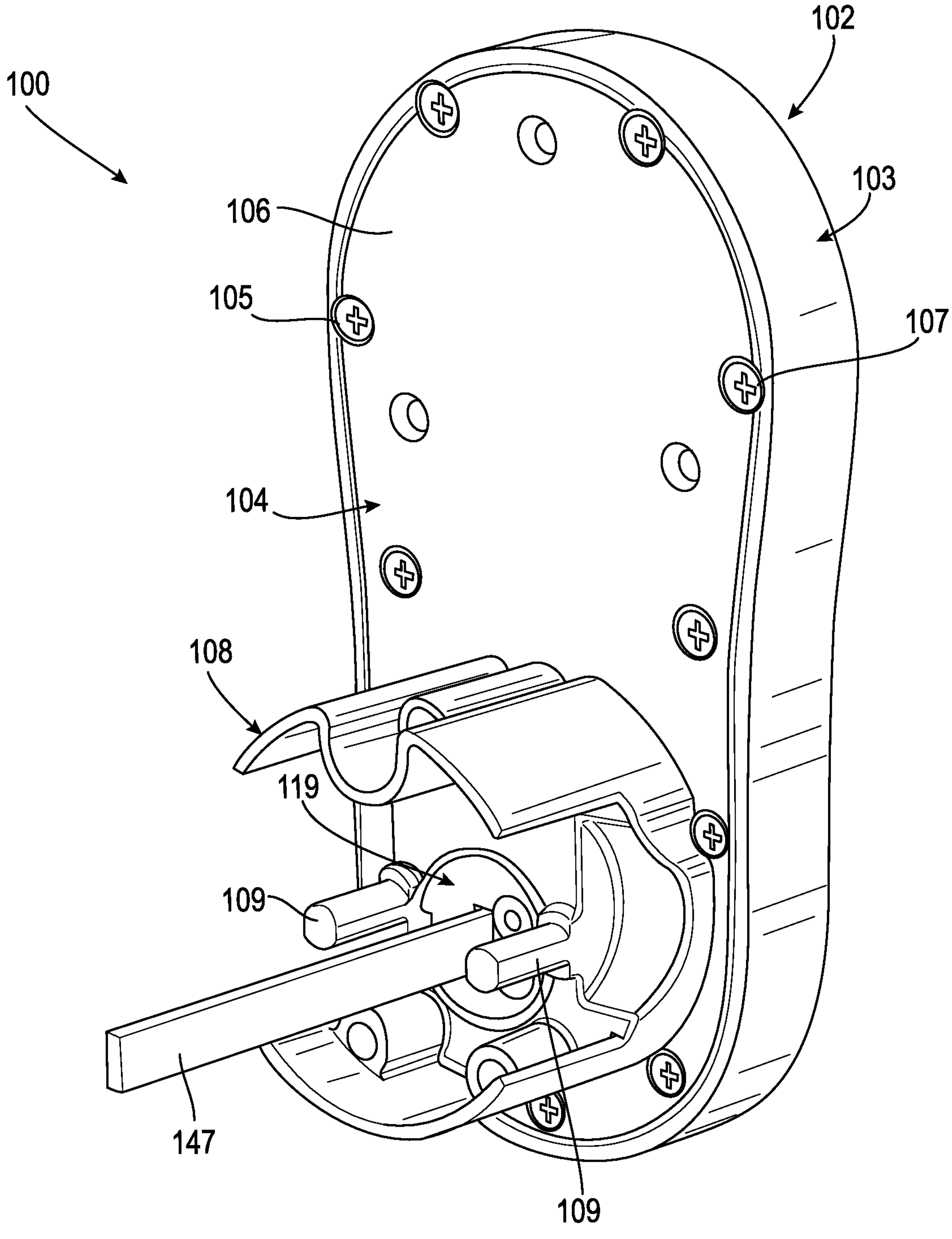
FIG. 1 is a perspective view of a lock according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Systems, devices, locking mechanisms, and methods in accordance with the present disclosure will now be described more fully with reference to the accompanying drawings, where one or more embodiments are shown. The systems, devices, locking mechanisms, and methods may be embodied in many different forms and are not to be construed as being limited to the embodiments set forth herein. Instead, these embodiments are provided so the disclosure will be thorough and complete, and will fully convey the scope of the systems, devices, and methods to those skilled in the art. Each of the systems, devices, locking mechanisms, and methods disclosed herein provides one or more advantages over conventional systems, devices, and methods.

Embodiments of the present disclosure are directed to a locking mechanism having a main hub assembly including a tailpiece hub coupled to a tailpiece, wherein the tailpiece is coupleable with a deadbolt, and a clutch assembly coupled to the main hub assembly, the clutch assembly comprising an actuator plate coupled with a driver plate, wherein the actuator plate is operable to rotate relative to the driver plate. The locking mechanism may further include an actuator assembly coupled to the clutch assembly, the actuator assembly comprising an actuator operable to bias a carriage along a first direction, and a thumbturn assembly coupled to the clutch assembly, the thumbturn assembly comprising a thumbturn positionable on an exterior side of a door.

In some embodiments, the locking mechanism can include at least one of the following features: a clutch, an always-lock feature, field swappable handing, manual key operation, and/or over-torque failsafe protection. In particular, in some embodiments, the locking mechanism can advantageously perform at least the following main functions. Firstly, an actuator-driven clutch feature can provide a connection between the thumbturn and deadbolt, allowing the user to actuate the deadbolt manually with the thumbturn. Secondly, connection between an external thumbturn and a tailpiece connected to a deadbolt allows a user to project the deadbolt at all times, whether the user is authenticated or not. Thirdly, the locking mechanism may be configured for a left hand ("LH") or right hand ("RH") door in the field. Fourthly, the thumbturn may include a core having an externally accessible keyhole to enable manual actuation of the deadbolt using a physical key.

Example embodiments of these features are described in the present disclosure. In some embodiments, a deadbolt is provided. In some embodiments, an uncredentialed state is described, where an external thumbturn and the deadbolt are not engaged, so that the deadbolt cannot be unlocked by a user on the outside of the door. In some embodiments, a credentialed state is described, where an external thumbturn and deadbolt are engaged, so that the deadbolt can be unlocked by a user on the outside of the door. This can happen after a valid credential is presented, for example, at a user interface of the locking mechanism. In other embodiments, the valid credential may be detected when a mobile device is in proximity to the locking mechanism.

Figure 2:
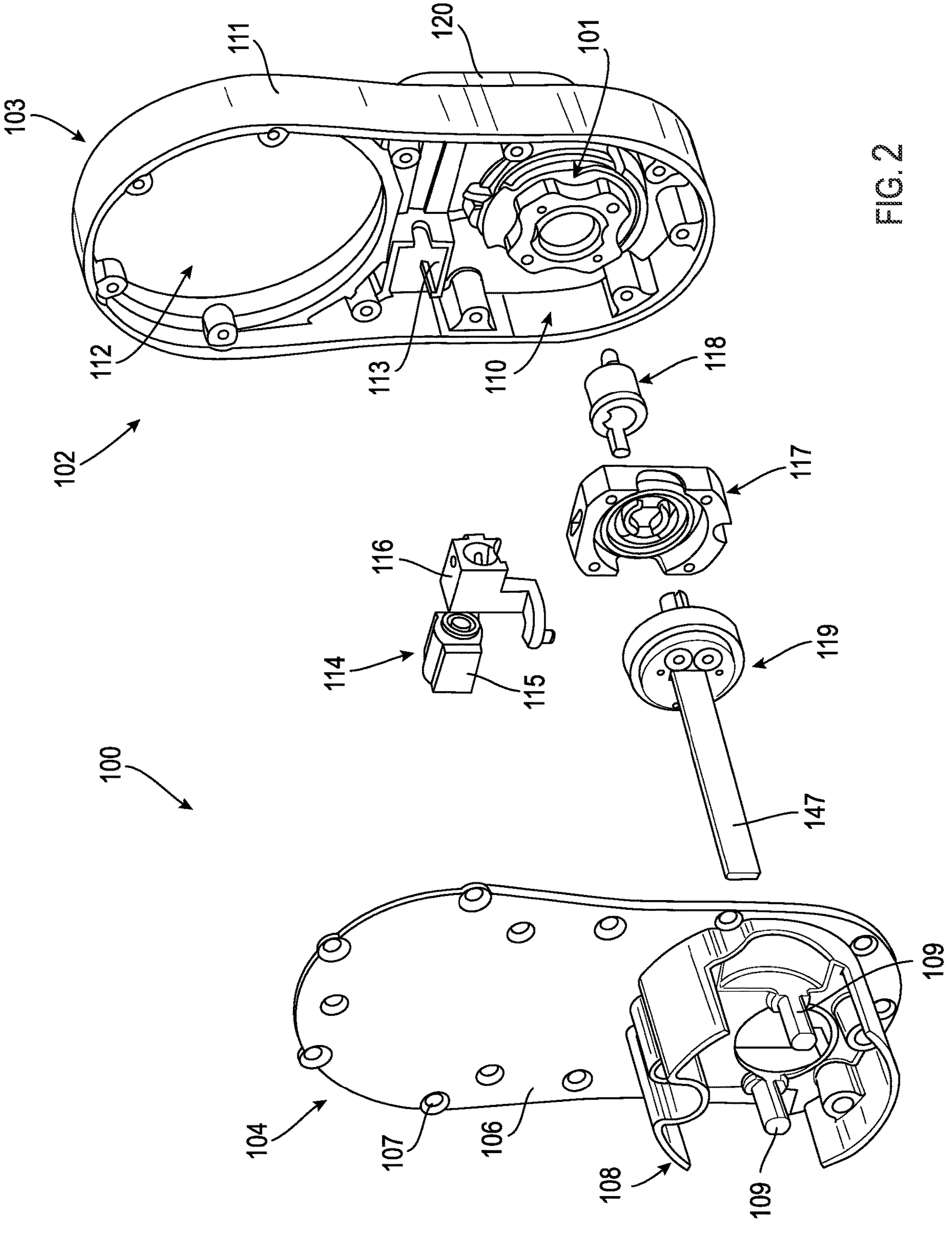
FIG. 2 is an exploded perspective view of the lock according to embodiments of the present disclosure.

FIGS. 1-2 show a locking mechanism (hereinafter "lock") 100 according to embodiments of the present disclosure. Although non-limiting, the lock 100 may be suitable for use with an access point door of a single or multi-unit building, including, but not limited to, building entrance doors, auxiliary entrance doors, auxiliary service doors, common room area doors, exercise room doors, individual unit doors, doors within units, and other relevant entrance points. The lock 100 may be part of an access system including, but not limited to, mobile devices, an access control cloud service, installed access control hardware/software, communication standards, and a credentialing layer to displace and/or supplement physical key management systems. In some cases, the system can eliminate the need for physical key or access cards.

As shown, the lock 100 may include a housing 102 defined, in part, by a front plate assembly 103 and a back plate assembly 104. The front plate assembly 103 and the back plate assembly 104 may be secured together by one or more fasteners 105 (e.g., screws) extending through openings 107 of a back plate 106 of the back plate assembly 104. The back plate assembly 104 may include a door channel housing 108 and a set (i.e., one or more) of pins 109 extending from the back plate 106. Although not shown, the door channel housing 108 is configured to extend through an opening provided between an interior and exterior side of a door. As best shown in FIG. 2, the front plate assembly 103 may include a main cavity 110 defined by a perimeter wall 111, and an opening 112 for receiving an interface (not shown) and hardware/software for operation of the lock 100. Within the main cavity 110 may be a thumbturn assembly 101 including a thumbturn 120 positioned on an exterior side of the door once the lock 100 is assembled.

In some embodiments, the opening 112 may house one or more processors or modules (not shown), including a wireless communications module configured to communicate with user mobile devices and other access control devices in its proximity, through a wireless transmitter and a wireless receiver. For example, communication from a user's mobile device can relate to granting the user access through the door. Also, within the opening 112 may be one or more power sources, such as a battery.

The front plate assembly 103 may further include an actuator housing 113 for receiving an actuator assembly 114. The actuator assembly 114 may include an electronic actuator 115 operably connected with a carriage 116, which is operably connected with a clutch assembly 117. A pin hub 118 of the thumbturn assembly 101 and a main hub assembly 119 may extend through and operate with the clutch assembly 117. As described in more detail below, linear translation of the clutch assembly 117 can cause engagement with the main hub assembly 119, which causes a connection between the thumbturn 120 and a deadbolt (not shown) coupled to a tailpiece 147 of the main hub assembly 119, thereby allowing for a user to actuate the deadbolt from an exterior side of the door.

Figure 3:
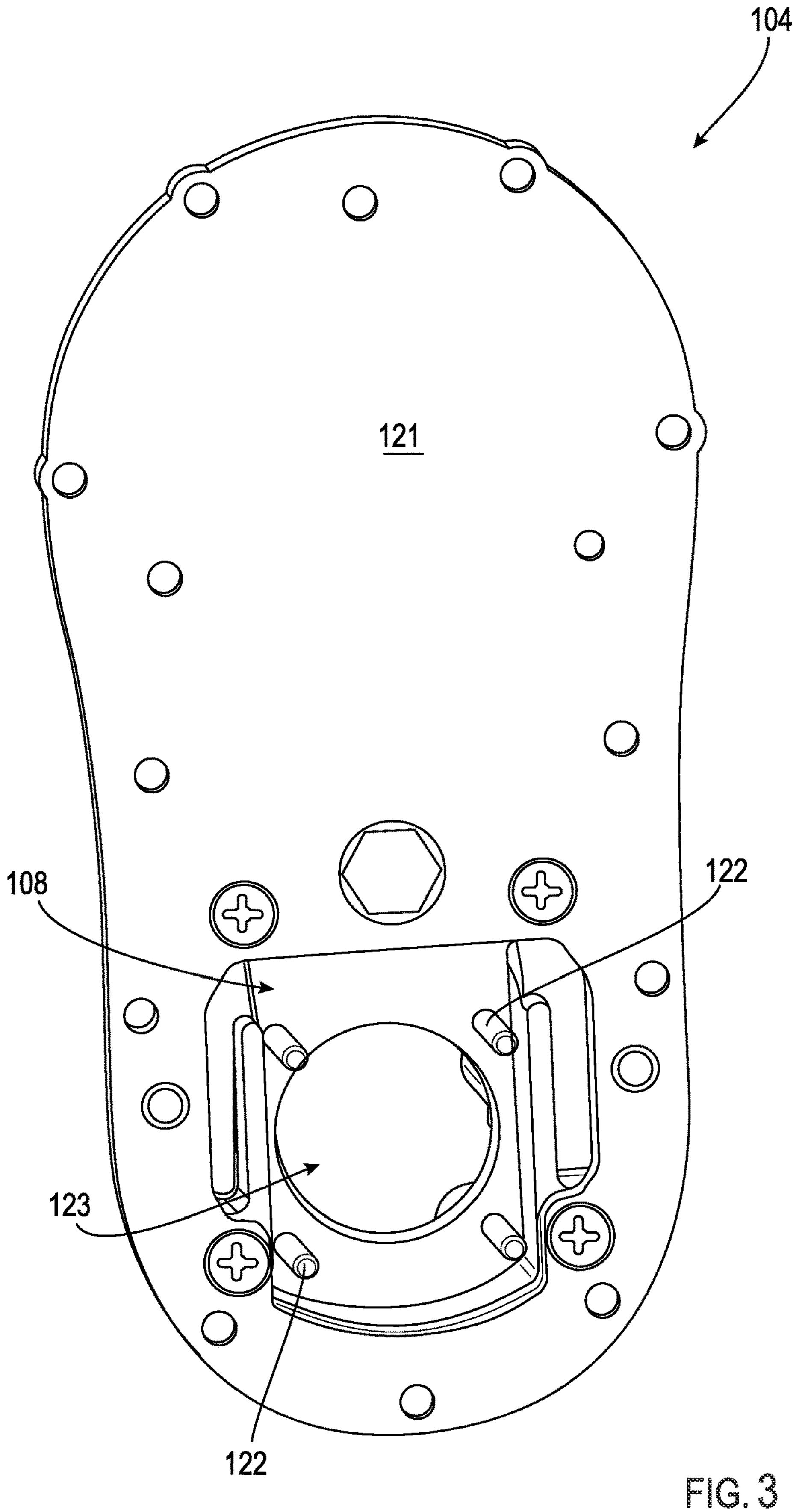
FIG. 3 is a perspective view of an internal side of a back plate assembly of the lock according to embodiments of the present disclosure.

FIG. 3 depicts an internal side 121 of the back plate assembly 104 according to embodiments of the present disclosure. As shown, the door channel housing 108 may include a plurality of pins 122 operable to extend within and support the clutch assembly 117. A central opening 123 through the door channel housing 108 receives the main hub assembly 119.

Although not shown, in some embodiments, the back plate assembly 104 may include one or more switches and switch actuators rotationally engaged with the tailpiece 147. For example, during use, a tailpiece follower of the tailpiece 147 may rotate to actuate one or more switches as the deadbolt is locked/unlocked. The switch state can then be used to determine deadbolt position.

Figure 4:
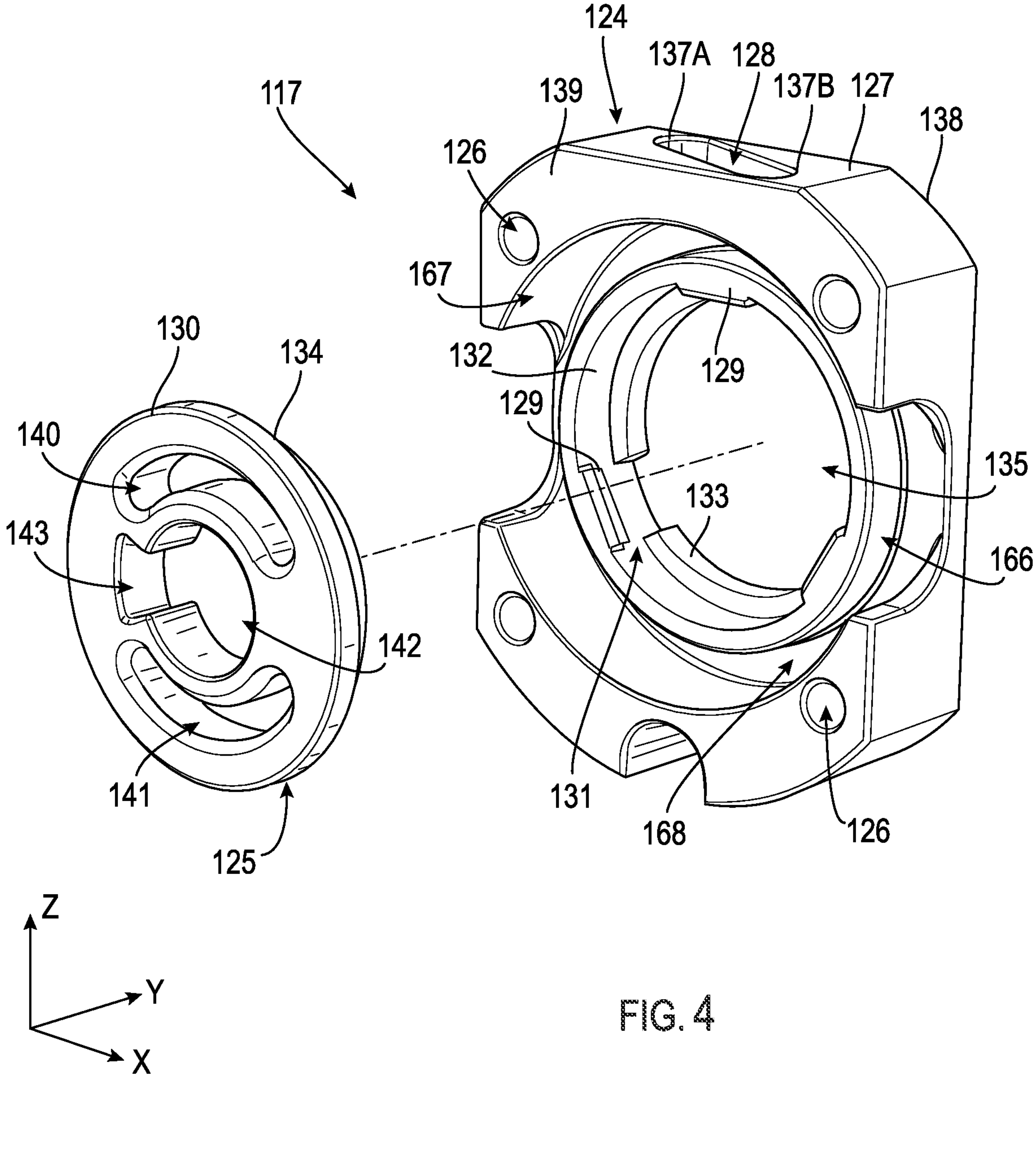
FIG. 4 is an exploded perspective view of a clutch assembly according to embodiments of the present disclosure.

FIG. 4 is an exploded view of the clutch assembly 117 according to embodiments of the present disclosure. As shown, the clutch assembly 117 includes a driver plate 124 and an actuator plate 125. The driver plate 124 may include a plurality of openings 126 for receiving corresponding plurality of pins 122 (FIG. 3) of the door channel housing 108. In some embodiments, an upper section 127 of the driver plate 124 may include an angled groove or channel 128, which interfaces with the carriage 116 of the actuator assembly 114, as will be described in more detail below. As shown, the channel 128 includes a first end 137A adjacent a first main side 138 of the driver plate 124 and a second end 137B adjacent a second main side 139 of the driver plate 124.

Although non-limiting, the driver plate 124 may include an inner cylinder 166 separated from a plate wall 167 by a plate channel 168. The inner cylinder 166 may include one or more snap-fit features 129, which interface with the actuator plate 125. More specifically, the snap-fit features 129 may engage with an outer edge 130 of the actuator plate 125 to prevent the actuator plate 125 from disengaging from the driver plate 124, while still allowing the actuator plate 125 to rotate freely within the driver plate 124, for example, within a channel 131 defined by an inner ring surface 132, a ridge 133, and the snap-fit features 129. The ridge 133 may engage with an inner edge 134 of the actuator plate 125 to prevent the actuator plate 125 from moving farther into opening 135 of the driver plate 124, for example, along the z-axis.

As will be described in greater detail below, the actuator plate 125 may include a first slot 140 operable to receive a first screw (e.g., a right-hand screw) and a second slot 141 operable to receive a second screw (e.g., a left-hand screw). The actuator plate 125 may further include an opening 142 including a keyed slot 143. During use, the opening 142 may receive a hub shaft (not shown) of the main hub assembly 119, while the keyed slot 143 may receive a key shaft (not shown) of the pin hub 118. Rotation of the key shaft causes the actuator plate 125 to rotate within the channel 131 of the driver plate 124.

Figure 5A:
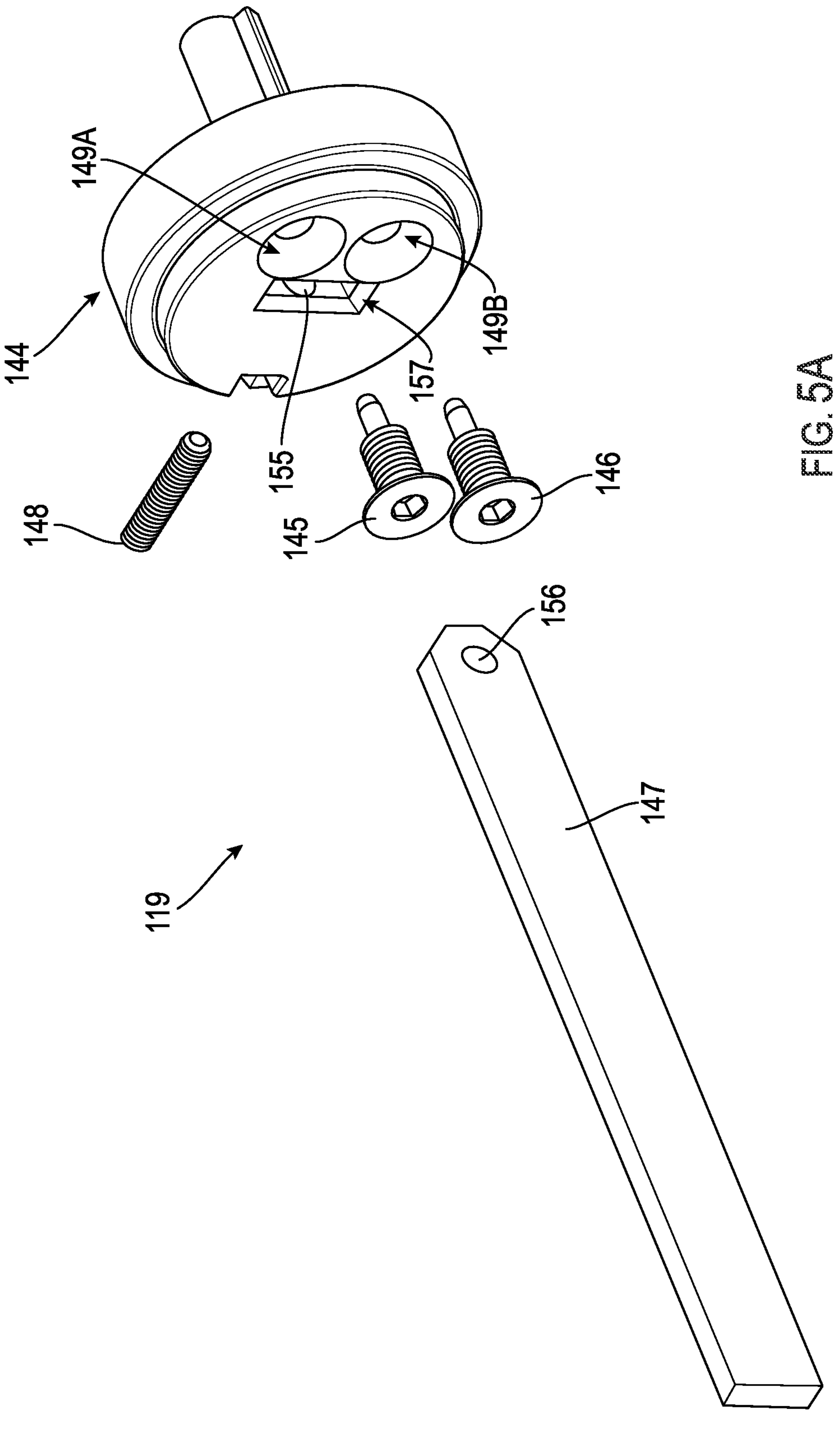
FIG. 5A is an exploded perspective view of a main hub assembly according to embodiments of the present disclosure.

FIG. 5A shows an exploded view of the main hub assembly 119 in greater detail. The main hub assembly 119 may include a tailpiece hub 144, a first screw 145, a second screw 146, the tailpiece 147, and a fastener 148. The fastener 148 may pass through a hub fastener channel 155 of the tailpiece hub 144 and a tailpiece opening 156 of the tailpiece 147 to connect the tailpiece 147 to the tailpiece hub 144 once the tailpiece 147 is inserted into a hub slot 157. A variety of fastening mechanisms such as screws, bolts, glue, press-fit, or other fasteners can be used to couple the tailpiece 147 to the tailpiece hub 144.

The first and second screws 145, 146 may thread into corresponding holes 149A, 149B of the tailpiece hub 144. Pins or other types of hardware can also be used instead of threaded screws. The lock 100 may be initially provided with both the first and second screws 145, 146. During installation, either the first screw 145 or the second screw 146 can be removed to configure the lock 100 for a right-hand (RH) or a left-hand (LH) door. For example, when the first screw 145 is present within the first slot 140 (FIG. 4) of the actuator plate 125, clockwise rotation of the thumbturn 120 for a RH door is enabled. Meanwhile, when the second screw 146 is present within the second slot 141 of the actuator plate 125, counter-clockwise rotation of the thumbturn 120 for a LH door is enabled.

Figure 5B:
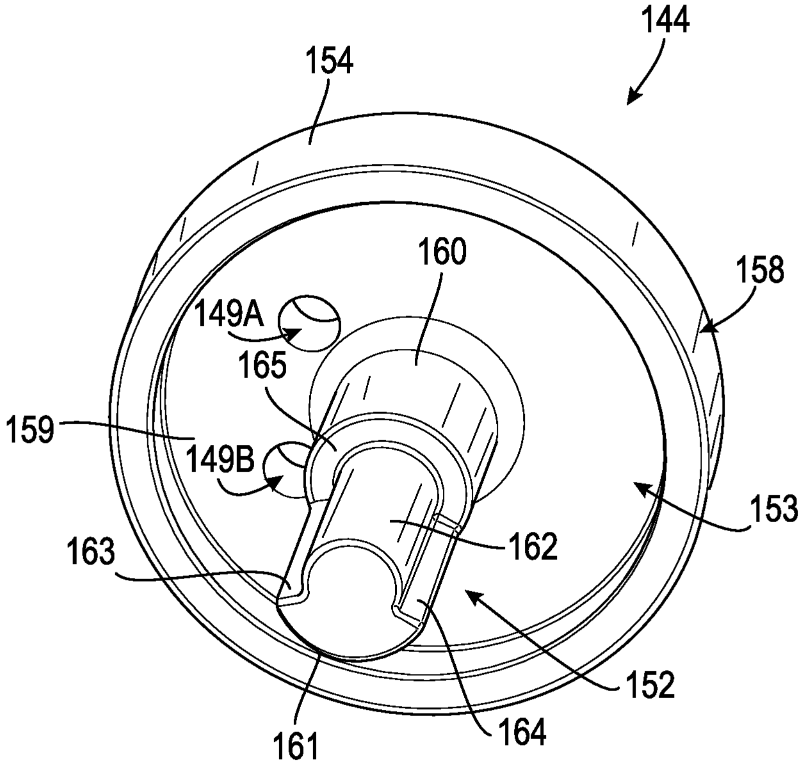
FIGS. 5B-5C are perspective views of a tailpiece hub according to embodiments of the present disclosure.
Figure 5C:
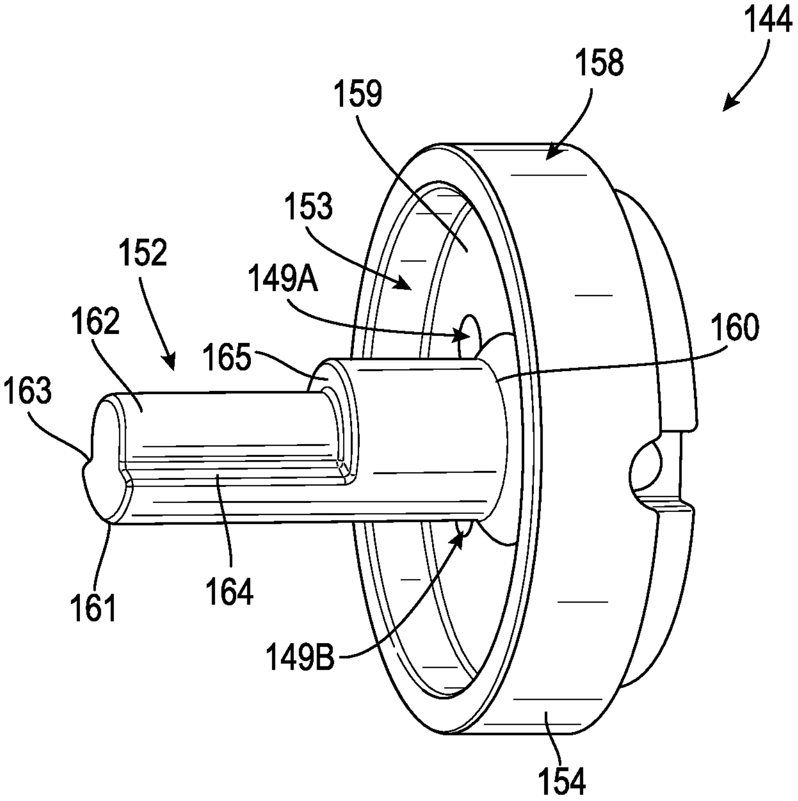

FIGS. 5B-5C show the tailpiece hub 144 in greater detail. In some embodiments, the tailpiece hub 144 may include a main cylinder 158 having a hub wall 154 surrounding an inner cavity 153, which is defined in part by an inner wall 159. Holes 149A, 149B may be formed through the inner wall 159. Extending from the inner wall 159 is a hub shaft 152. As shown, the hub shaft 152 may include a fixed, first end 160 and a free, second end 161. In some embodiments, the first end 160 has a diameter or thickness, which is greater than a diameter or thickness of the second end 161. For example, the second end 161 may include a cylindrical portion 162 between a first engagement surface 163 and a second engagement surface 164. Said differently, the first and second engagement surfaces 163, 164 may be circumferentially spaced from another along an exterior of the cylindrical portion 162. As shown, a plane defined by each of the first and second engagement surfaces 163, 164 may generally extend radially from the cylindrical portion 162. A third engagement surface 165 may face the second end 161.

Figure 6A:
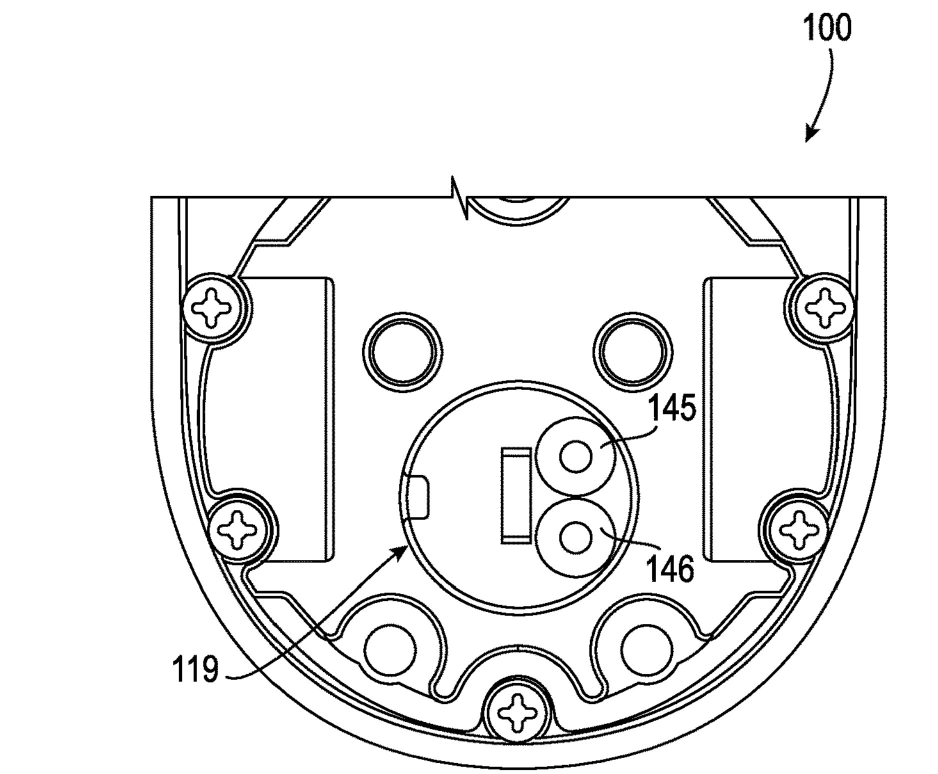
FIGS. 6A-6B are front and back views, respectively, of a field-swappable handing feature of the lock according to embodiments of the present disclosure.
Figure 6B:
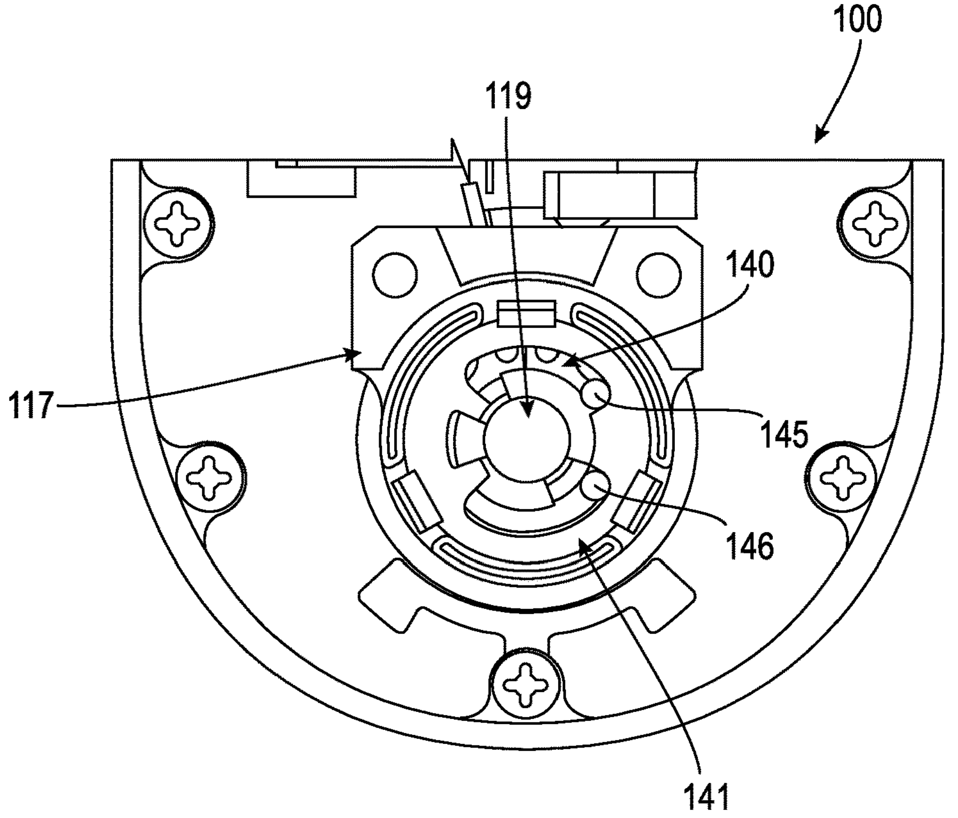

FIGS. 6A-6B further demonstrate the field-swappable handing feature of the lock 100 of the present disclosure. FIG. 6A shows an example back view of a portion of the main hub assembly 119, while FIG. 6B shows an example cross-section of the clutch assembly 117 engaging with the main hub assembly 119, according to some embodiments, depending on which screw is present. As noted, the lock 100 can be provided with first and second screws 145, 146. In order to set the handing configuration during installation, one of the first and second screws 145, 146 is inserted into the first (e.g., RH) slot 140 or the second (e.g., LH) slot 141. Similarly, the lock may be shipped with both first and second screws 145, 146 in place, wherein one of the first and second screws 145, 146 can be selectively removed prior to installation to achieve the same effect. In the example embodiment of FIGS. 6A-6B, only one screw is used to configure the lock 100 in the RH or LH mode.

Figure 7A:
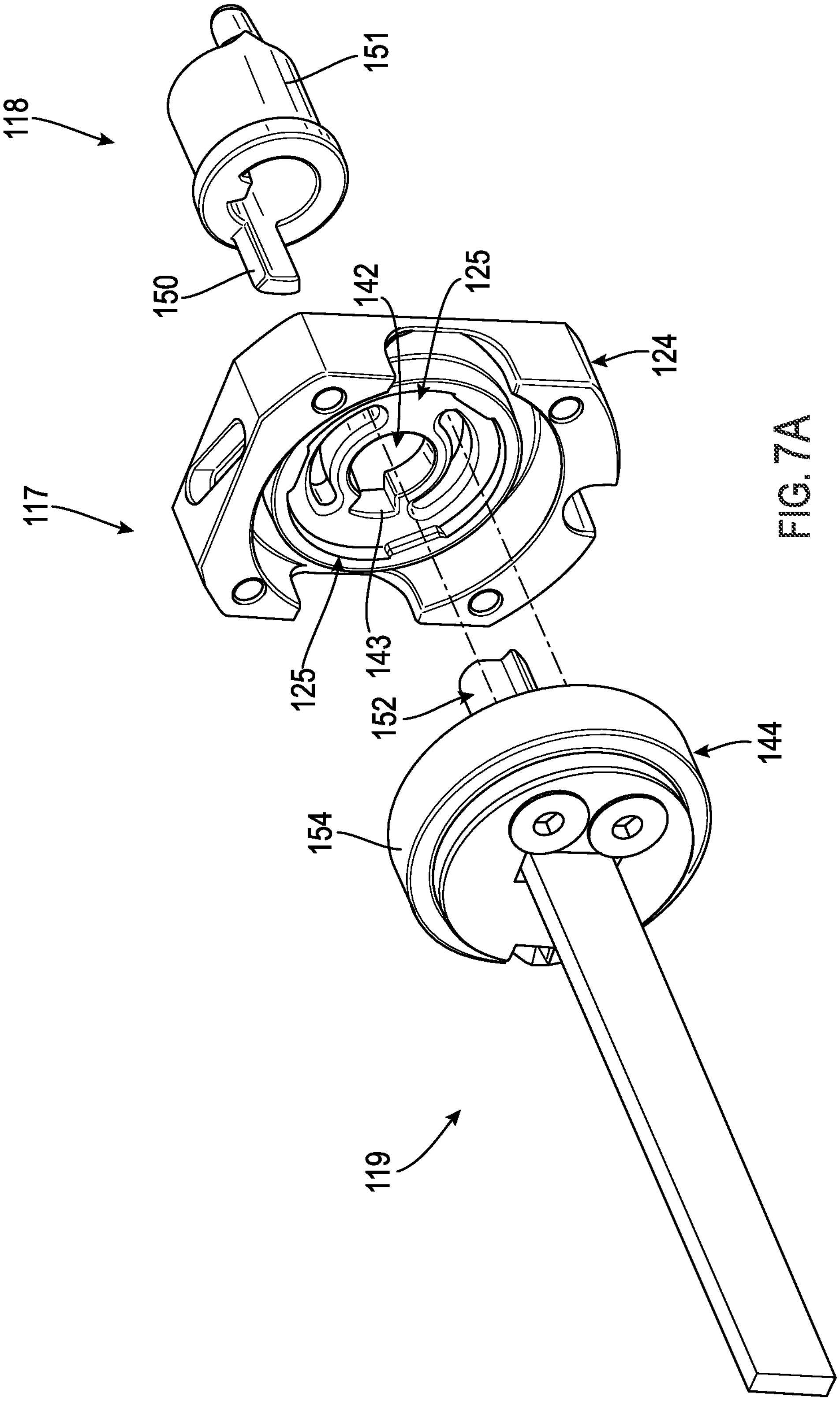
FIGS. 7A-7B are perspective views of the main hub assembly, the clutch assembly, and a pin hub according to embodiments of the present disclosure.
Figure 7B:
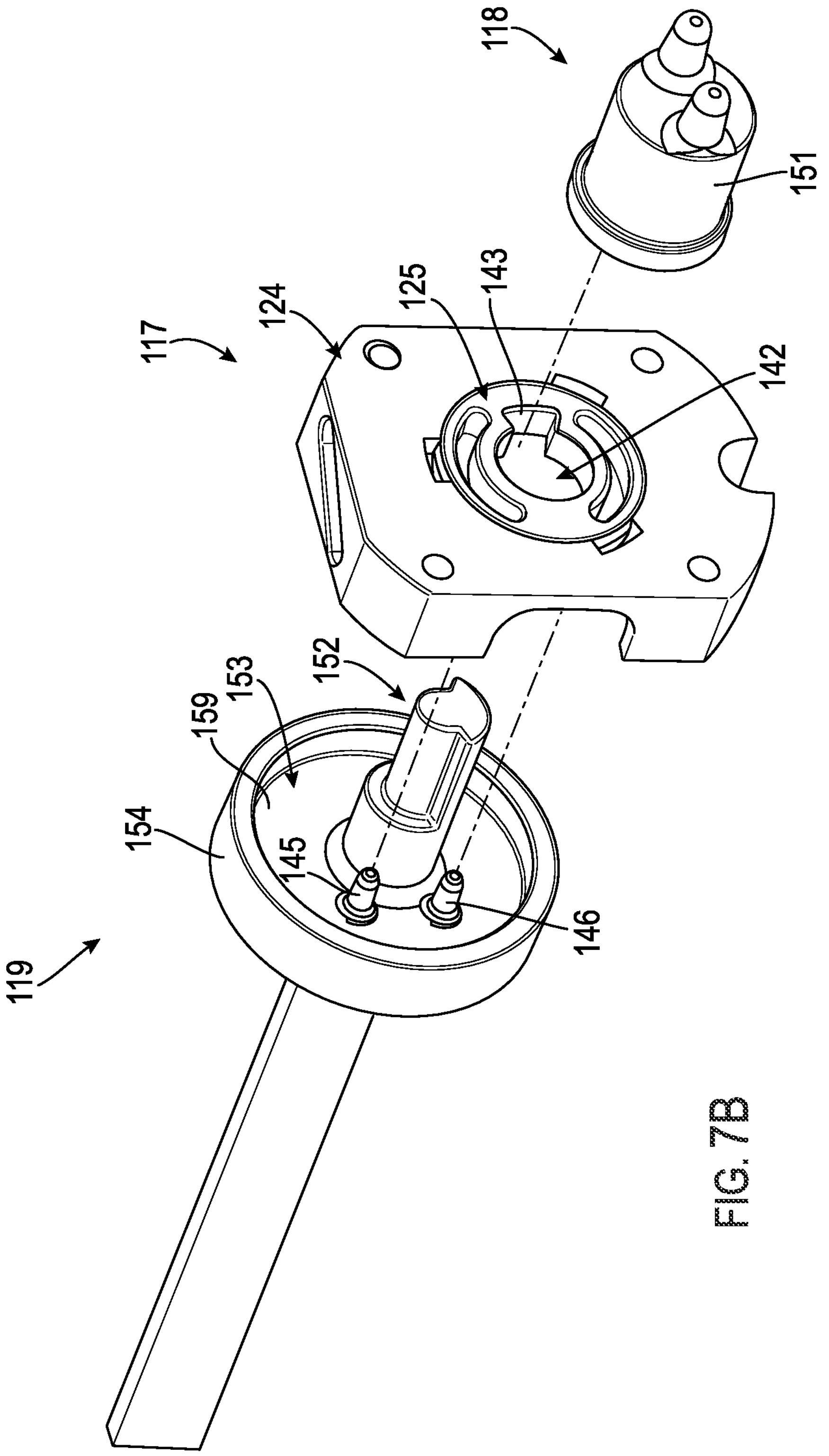

FIGS. 7A-7B illustrate alignment and engagement between the main hub assembly 119, the clutch assembly 117, and the pin hub 118 of the thumbturn assembly 101 according to embodiments of the present disclosure. In some embodiments, the pin hub 118 includes the key shaft or tab 150 extending axially from a main body 151. The tab 150 is configured to extend within the keyed slot 143 of the actuator plate 125. As shown, the tab 150 and the keyed slot 143 have complimentary shapes to promote engagement therebetween.

As further shown, the tailpiece hub 144 of the main hub assembly 119 includes the inner cavity 153 defined by the hub wall 154. The hub shaft 152 may extend axially within the inner cavity 153, e.g., from the inner wall 159. As shown, the first and second screws 145, 146 may also extend axially within the inner cavity 153. The hub shaft 152 may extend through the opening 142 of the actuator plate 125 for insertion within the main body 151 of the pin hub 118. Rotation of the tab 150 causes the actuator plate 125 to rotate relative to the driver plate 124.

Figure 8A:
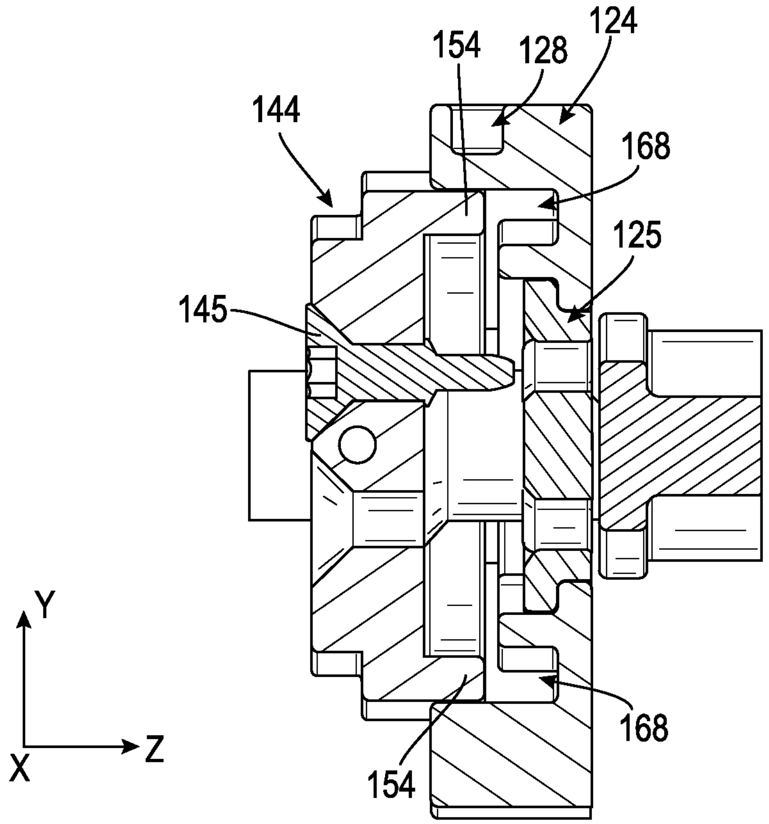
FIG. 8A is a side cross-sectional view of the clutch assembly and the tailpiece hub in an uncredentialed state according to embodiments of the present disclosure.

More specifically, with reference to FIG. 8A, in an 'uncredentialed' state, which may be determined by a communication network and access control software and/or hardware of the lock 100, the first screw 145 is also disengaged from, and does not contact, the actuator plate 125. Additionally, the hub wall 154 of the tailpiece hub 144 may not be fully inserted into the plate channel 168 of the driver plate 124 (e.g., along the z-axis).

Figure 8B:
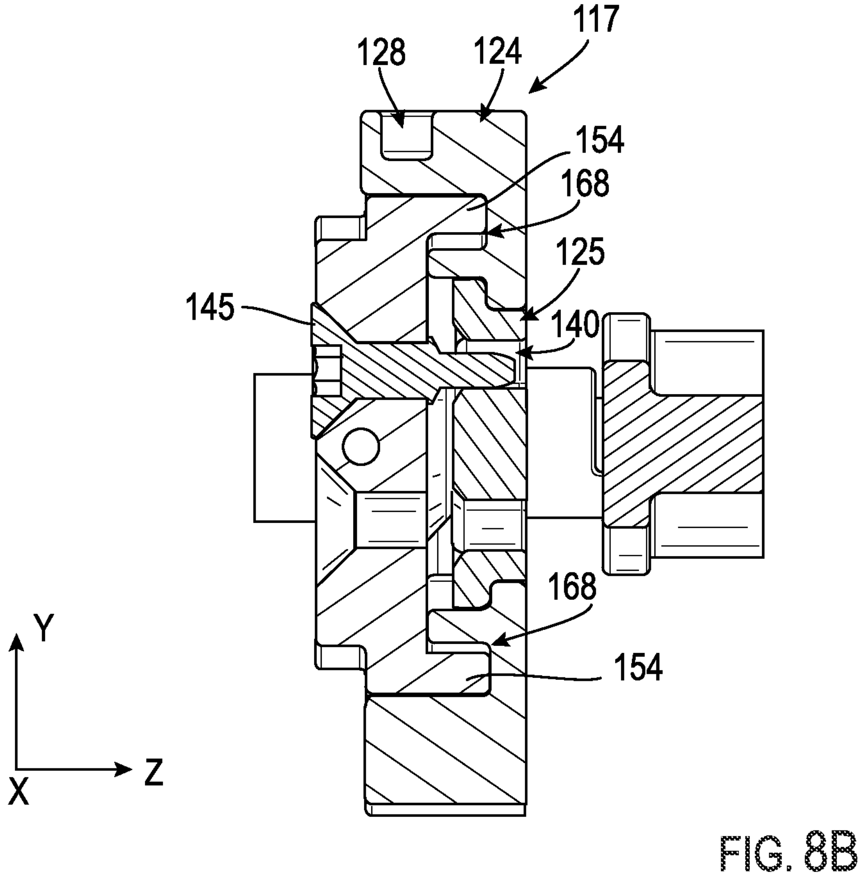
FIG. 8B is a side cross-sectional view of the clutch assembly and the tailpiece hub in a credentialed state according to embodiments of the present disclosure.

As shown in FIG. 8B, in a 'credentialed' state, the tailpiece hub 144 and the clutch assembly 117 may be brought closer together by the actuator assembly 114 until the first screw 145 enters the first slot 140 of the actuator plate 125. The hub wall 154 of the tailpiece hub 144 may also be inserted into the plate channel 168 of the driver plate 124. In some embodiments, movement of the tailpiece hub 144 and the driver plate 124 relative to one another is caused, in part, by movement of a carriage pin (not shown) of the carriage 116 within the channel 128 of the driver plate 124.

Figure 9:
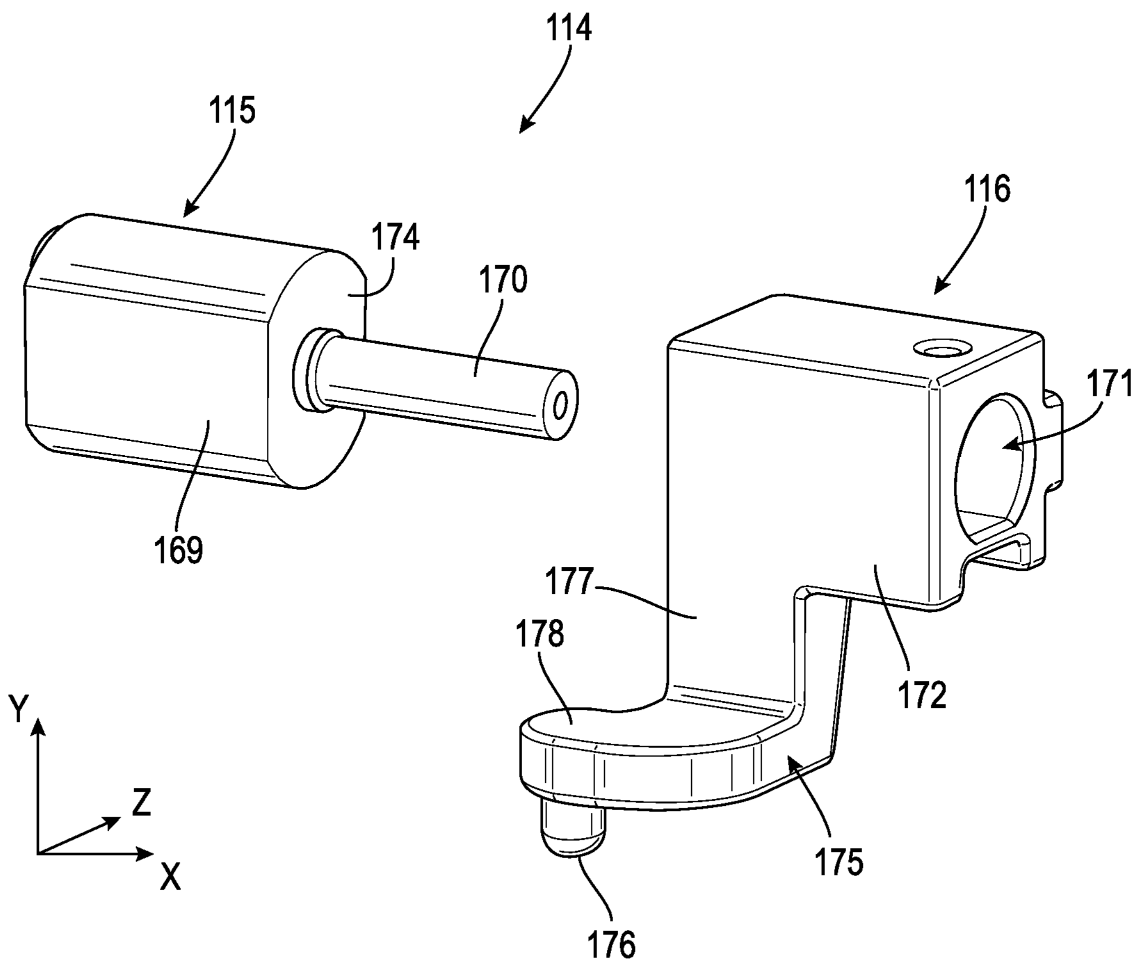
FIG. 9 is an exploded perspective view of an actuator assembly according to embodiments of the present disclosure.

FIG. 9 is an exploded view of the actuator assembly 114 according to a non-limiting embodiment. As shown, the actuator assembly 114 includes the electronic actuator 115 operably connected with the carriage 116. In some embodiments, the electronic actuator 115 includes an actuator body 169 and an actuator pin 170 extending from the actuator body 169. The actuator pin 170 may extend within a carriage opening 171 of a carriage body 172 of the carriage 116. Although not shown, the actuator assembly 114 may further include a spring in contact with a surface 174 of the actuator body 169 and the carriage body 172. In some embodiments, the actuator pin 170 is fixed or detachably coupled to the carriage body 172 so that axial movement of the actuator pin 170 biases (e.g., pulls) the carriage body 172 against the spring force from the spring along a first direction (the x-axis). As stated above, the electronic actuator 115 may be energized/activated in response to a signal received at a wireless communications module within the housing 102, wherein the signal indicates a valid credential has been received at the lock 100. It will be appreciated that the actuator assembly 114 shown and described is just one possible approach for biasing the carriage 116. In other embodiments, the actuator assembly 114 may include any type or variety of motors, solenoids, etc., which may be connected to springs, worm drives, lead screws, etc., or connected directly to the carriage body 172. Embodiments herein are not limited in this context.

As further shown, the carriage 116 may include a carriage arm 175 extending from the carriage body 172. The carriage arm 175 may include a first section 177 extending vertically (e.g., along the y-direction) beneath the carriage body 172, and a second section 178 extending perpendicularly (e.g., along the z-direction) from the first section 177. In some embodiments, the second section 178 of the carriage arm 175 may include a carriage pin 176 connected to an underside thereof. As shown, the carriage pin 176 is generally offset, along the z-direction and y-direction, relative to a central axis of the actuator pin 170. Different carriage 116 configurations are possible in other embodiments. Embodiments herein are not limited in this context.

Figure 10:
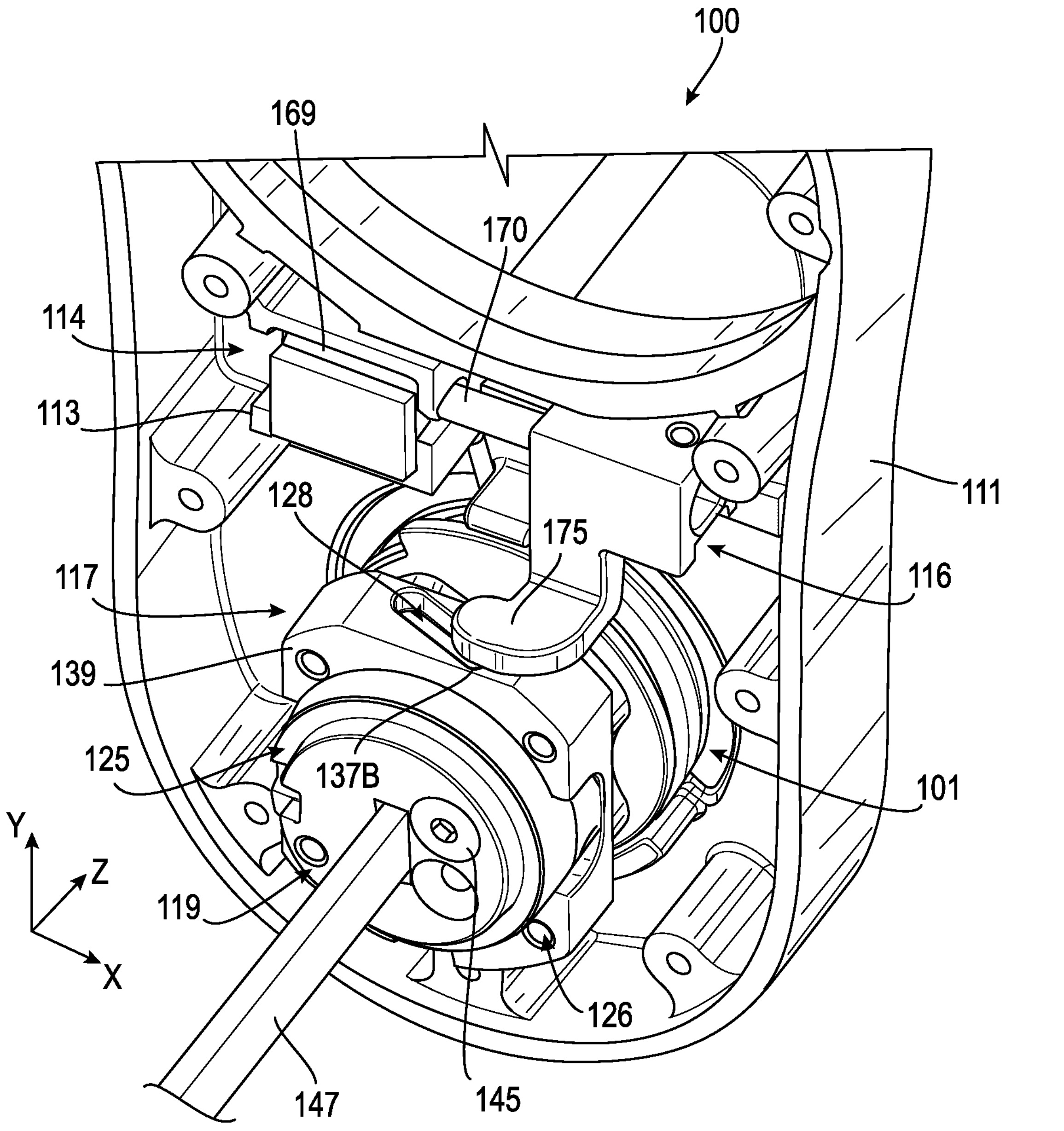
FIGS. 10-11 are perspective views demonstrating operation of the actuator assembly and the clutch assembly according to embodiments of the present disclosure.
Figure 11:
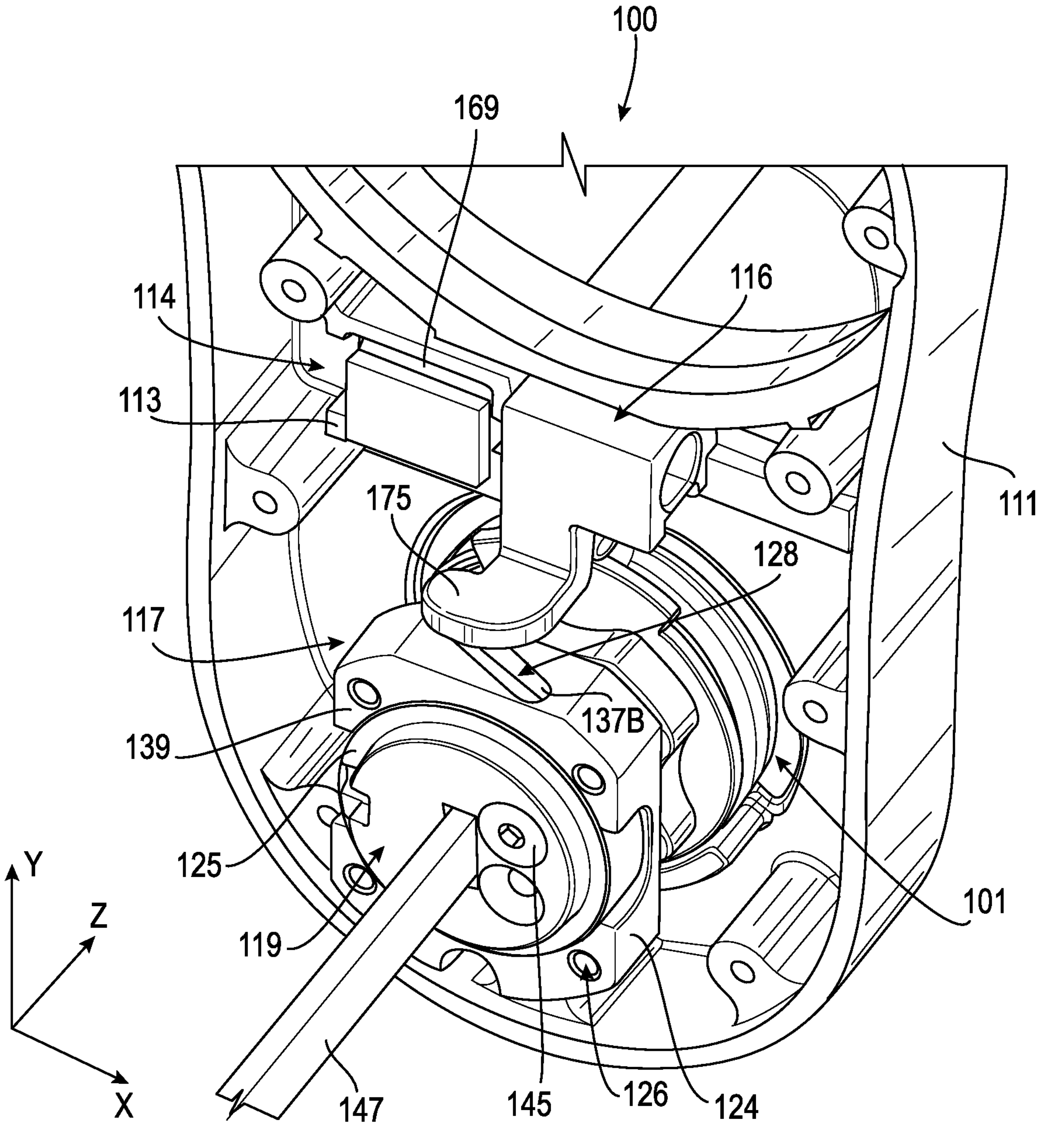

As further shown in FIGS. 10-11, the actuator assembly 114 is operable to transition the lock 100 between credentialed and uncredentialed states. In FIG. 10, the actuator assembly 114 is in an uncredentialed state in which the actuator pin 170 is extended away (e.g., along the x-direction) from the actuator body 169. In other embodiments, the actuator assembly 114 is in a credentialed state when the actuator pin 170 is extended away from the actuator body 169. The carriage 116 may be positioned away from the actuator housing 113 and towards the perimeter wall 111. The carriage pin (not shown) of the carriage arm 175 may be positioned proximate the second end 137B of the channel 128, which is adjacent the second main side 139 of the driver plate 124. As a result, the clutch assembly 117 may be separated from the pin hub 118 (not shown).

In order to transition from the uncredentialed state to the credentialed state, the electronic actuator 115 pulls the carriage 116 to the left (e.g., negative x-direction), as demonstrated in FIG. 11. As the carriage moves 116, the carriage pin slides in the channel 128, from the second end 137B towards the first end 137A. This causes the clutch assembly 117 to move along an axis (e.g., z-axis), which is perpendicular to the direction of travel of the carriage 116.

The driver plate 124 slides along the pins 122 (not shown) in the back plate assembly 104, via the plurality of openings 126, until the carriage pin reaches the first end 137A of the channel 128. The clutch assembly 117 is now in the credentialed state, allowing for the first screw 145 to engage with the actuator plate 125. The clutch assembly 117 may now also be connected to the thumbturn assembly 101 when the clutch assembly 117 is in the credentialed state. As a result, when the thumbturn (not shown) is turned, the tailpiece 147 of the main hub assembly 119 is operable to retract the deadbolt.

In some embodiments, once the clutch assembly 117 is in the credentialed state, an automatically relock procedure may be initiated to return the lock to the uncredentialed state after a predetermined period of time. For example, after expiration of 5, 10, 20 minutes, 3 hours, etc., the electronic actuator 115 may be energized (or de-energized) so that the carriage 116 moves away from the actuator housing 113 and towards the perimeter wall 111. As the carriage 116 moves away from the actuator housing, the clutch assembly 117 may disengage from the main hub assembly 119, which causes the first or second screws 145, 146 to disengage from the actuator plate 125. This feature can result in auto-relock, or the ability to leave the lock 100 in an 'armed' or 'credential approved' state for a desired period of time, which can be configured by a user.

Figure 12A:
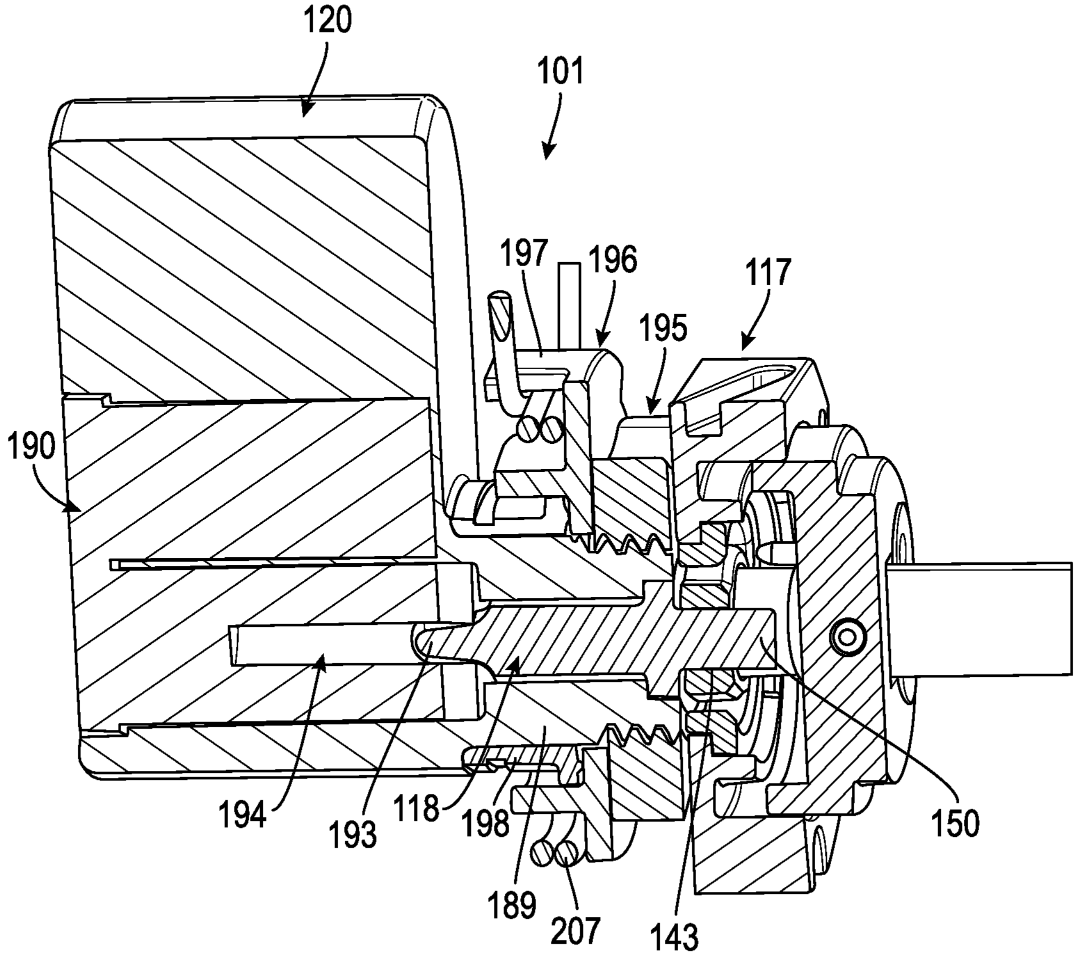
FIG. 12A is a side cross-sectional view of the lock according to embodiments of the present disclosure.
Figure 12B:
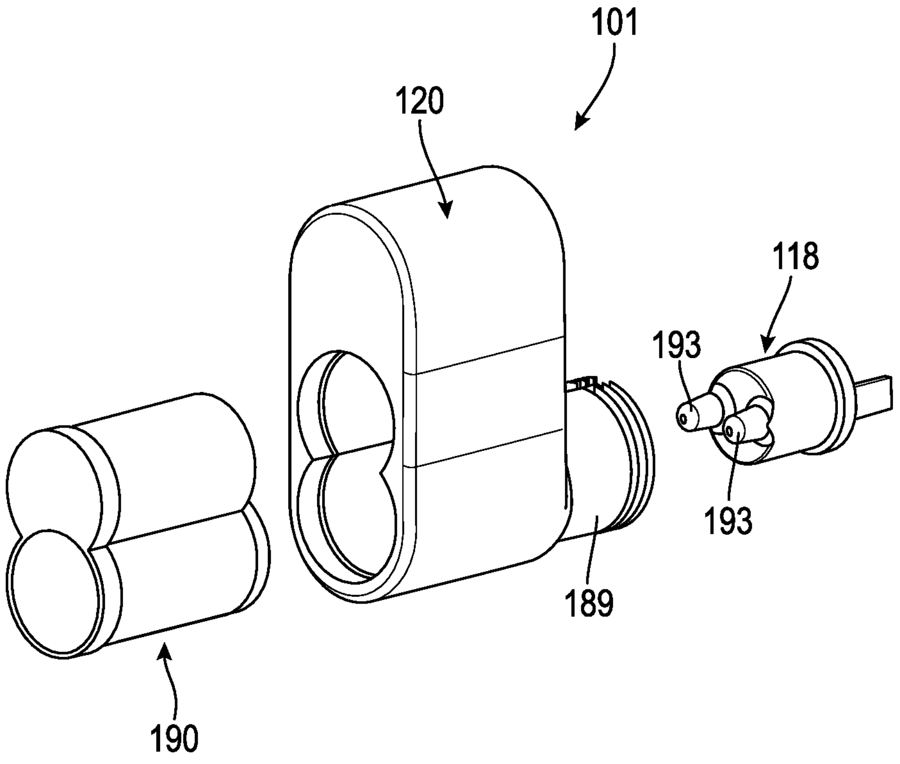
FIG. 12B is an exploded perspective view of a portion of a thumbturn assembly according to embodiments of the present disclosure.

FIGS. 12A-12B demonstrate aspects of the thumbturn assembly 101 in greater detail. As shown, the thumbturn assembly 101 includes the thumbturn 120 extending from a shaft 189, and an interchangeable core (IC) cylinder 190 within the thumbturn 120, which allows a user to lock and unlock the deadbolt using a traditional physical key in some embodiments. In some embodiments, the IC cylinder 190 may be installed and removed from the thumbturn 120 using a control key (not shown).

As shown, the pin hub 118 may be received within an interior of the shaft 189. A set of pins 193 of the pin hub 118 may extend within corresponding openings 194 of the second cylinder 192. As a result, the thumbturn 120 is engaged with the pin hub 118, which is engaged with the actuator plate 125 via the tab 150 positioned within the keyed slot 143. As best shown in FIG. 12A, the thumbturn assembly 101 may further include a nut 195 connecting the thumbturn 120 to the front plate assembly 103. In some embodiments, the nut 195 may include internal threading engaged with external threading of the shaft 189 of the thumbturn 120. A tooth 197 of a stop plate 196 engages a spring 207 to maintain/return the thumbturn 120 to a desired position, for example, to prevent displaying the position of the deadbolt. An interior split washer 198 is positioned between the stop plate 196 and the shaft 189.

Figure 13A:
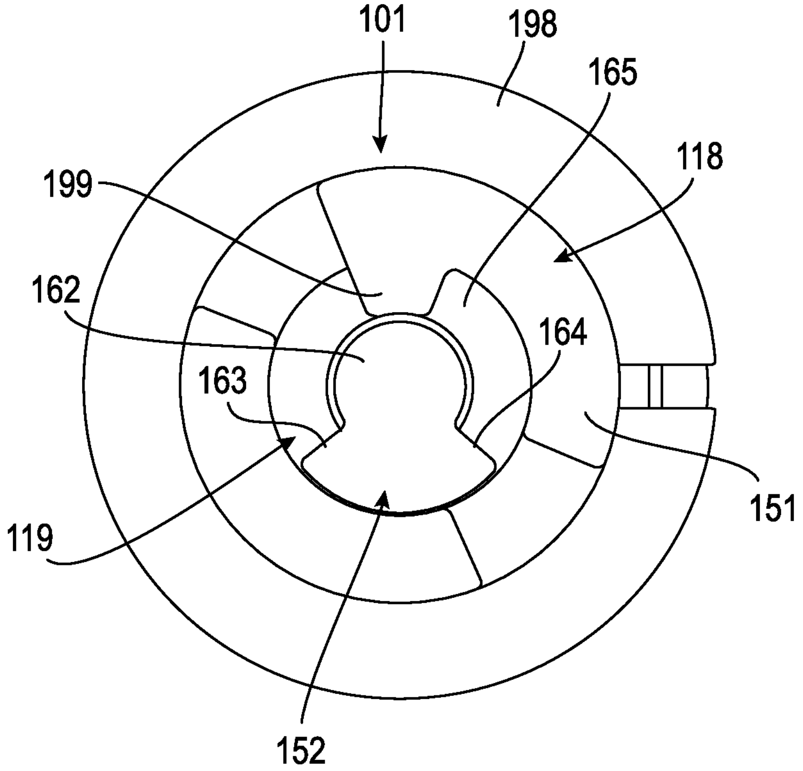
FIGS. 13A-13B are cross-sectional views of the thumbturn assembly and the main hub assembly according to embodiments of the present disclosure.
Figure 13B:
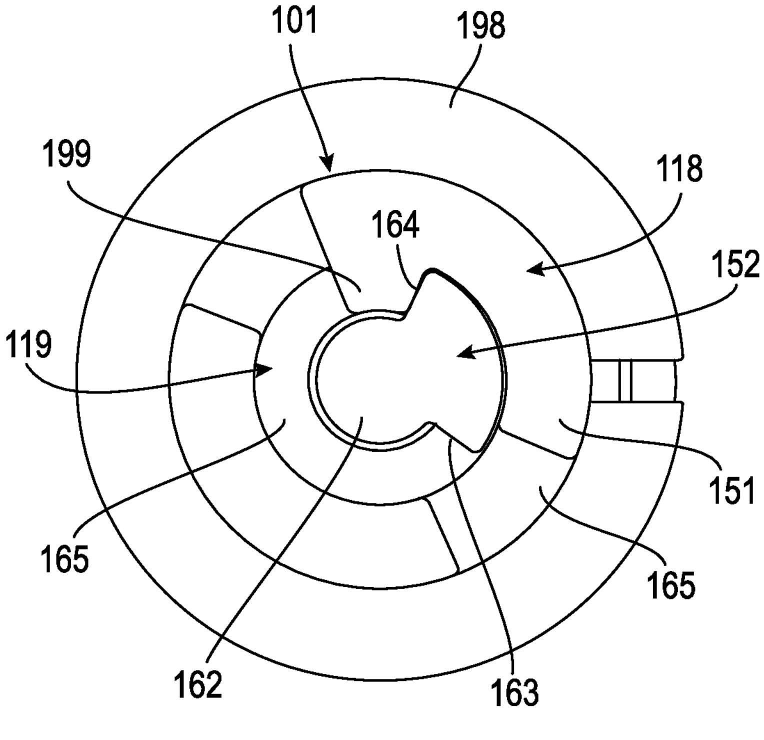

In some embodiments, the lock 100 may advantageously include an "always lock" feature, which provides a user with the ability to lock the deadbolt, without requiring a valid credential, from an exterior side of the door by rotating the thumbturn 120. As shown in the cross-sectional views of FIGS. 13A-13B, this may be accomplished by the interface between the thumbturn assembly 101 and the main hub assembly 119, which is connected to the deadbolt via the tailpiece 147 (not shown). FIG. 13A shows an example interface between the main body 151 of the pin hub 118 when the deadbolt is locked, according to some embodiments. More specifically, a locking tab 199 extending from an interior of the main body 151 is positioned adjacent an exterior surface of the cylindrical portion 162 of the hub shaft 152, between the first engagement surface 163 and the second engagement surface 164. The locking tab 199 may extend adjacent the third engagement surface 165. As shown in FIG. 13B, the deadbolt is unlocked, and the pin hub 118 can rotate clockwise or counterclockwise until the locking tab 199 is brought into contact with either the first or second engagement surfaces 163, 164 to lock the deadbolt, i.e., project the deadbolt into the door frame. In order to unlock the deadbolt, the clutch assembly 117 may be actuated by the actuator assembly 114, as described above.

It will be appreciated that the hub shaft 152 changes position based on door handing. For example, the state shown in FIG. 13B is a RH door, and counterclockwise rotation (perspective from outside of door) of the thumbturn 120 causes the locking tab 199 to engage the second engagement surface 164 of the hub shaft 152 to lock the deadbolt. On a LH door, clockwise rotation of the thumbturn 120 causes the locking tab 199 to engage with the first engagement surface 163 of the hub shaft 152 to lock the deadbolt.

Figure 14:
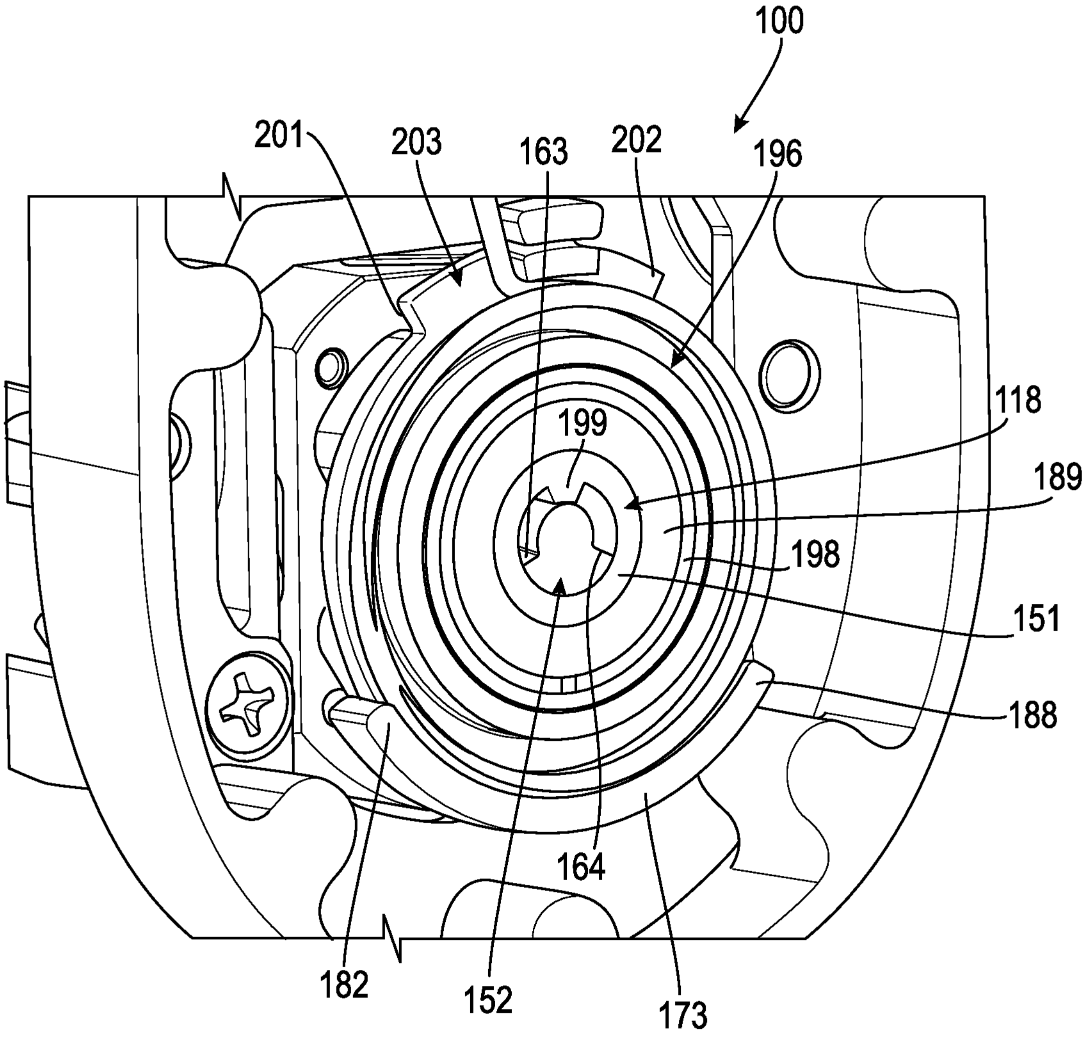
FIG. 14 is a perspective cross-sectional view of the thumbturn assembly according to embodiments of the present disclosure.

As shown in FIG. 14, once the lock 100 has been locked from the exterior of the door, e.g., using the thumbturn 120, a blocking ring 173 positioned along an underside of the stop plate 196 prevents a user from being able to subsequently unlock the door without first being credentialed. More specifically, the blocking ring 173 includes a first end 182 and a second end 188 operable to engage, respectively, first and second ends 201, 202 of a projection 203 of the stop plate 196. During use, when the shaft 189 of the thumbturn 120 is rotated, the main body 151 of the pin hub 118 begins to rotate as well. Before the locking tab 199 of the pin hub 118 can engage the first engagement surface 163 or the second engagement surface 164 of the hub shaft 152, resulting in rotation of the tailpiece 147 connected to the deadbolt, the first end 201 or the second end 202 of the projection 203 engages either the first end 182 or the second end 188 of the blocking ring 173.

Figure 15A:
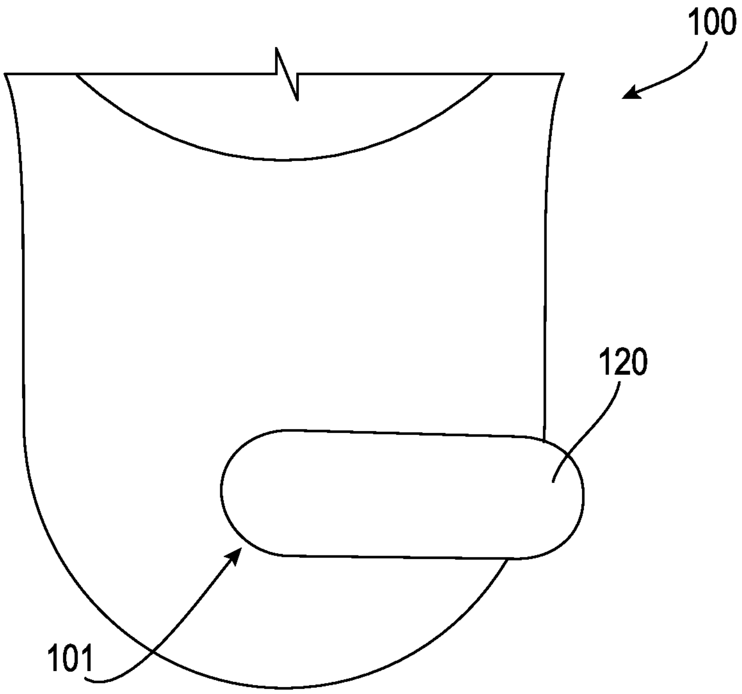
FIGS. 15A-15B demonstrate rotational limits of the thumbturn assembly according to embodiments of the present disclosure.
Figure 15B:
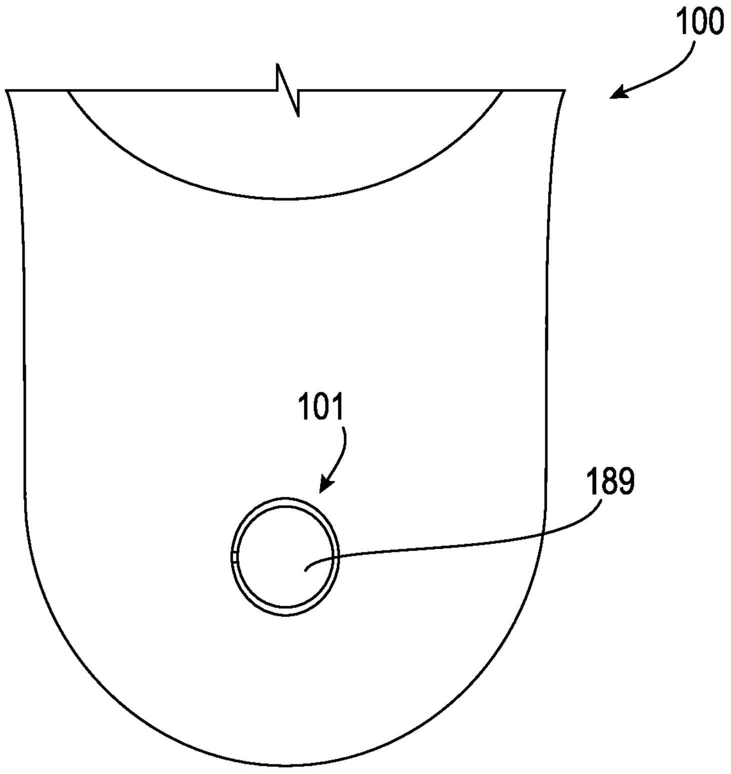

In some embodiments, the thumbturn assembly 101 further protects against uncredentialed manual override, such that putting excessive force on the thumbturn 120 does not allow entry. For example, the thumbturn 120 has a rotational limit in both the clockwise and counterclockwise directions. As described above, during normal use, the first and second ends 182, 188 of the blocking ring 173 stop when engaged with the projection 203 of the stop plate 196. However, if excessive force beyond a threshold is applied to the thumbturn 120 of FIG. 15A to rotate the thumbturn 120 further in the clockwise direction, e.g., in an attempt to gain entry to a space without a valid credential, the external thumbturn 120 can shear off from the shaft 189, leaving behind just a flat surface of the shaft 189 of the thumbturn assembly 101, as shown in FIG. 15B. The geometry, thickness and/or material of the thumbturn 120 relative to the shaft 189 of the thumbturn assembly 101 may influence failure shear point/amount. In exemplary embodiments, the exposed shaft 189 provides no component or surface to engage, making it difficult to apply another high load to the thumbturn assembly 101.

Figure 16A:
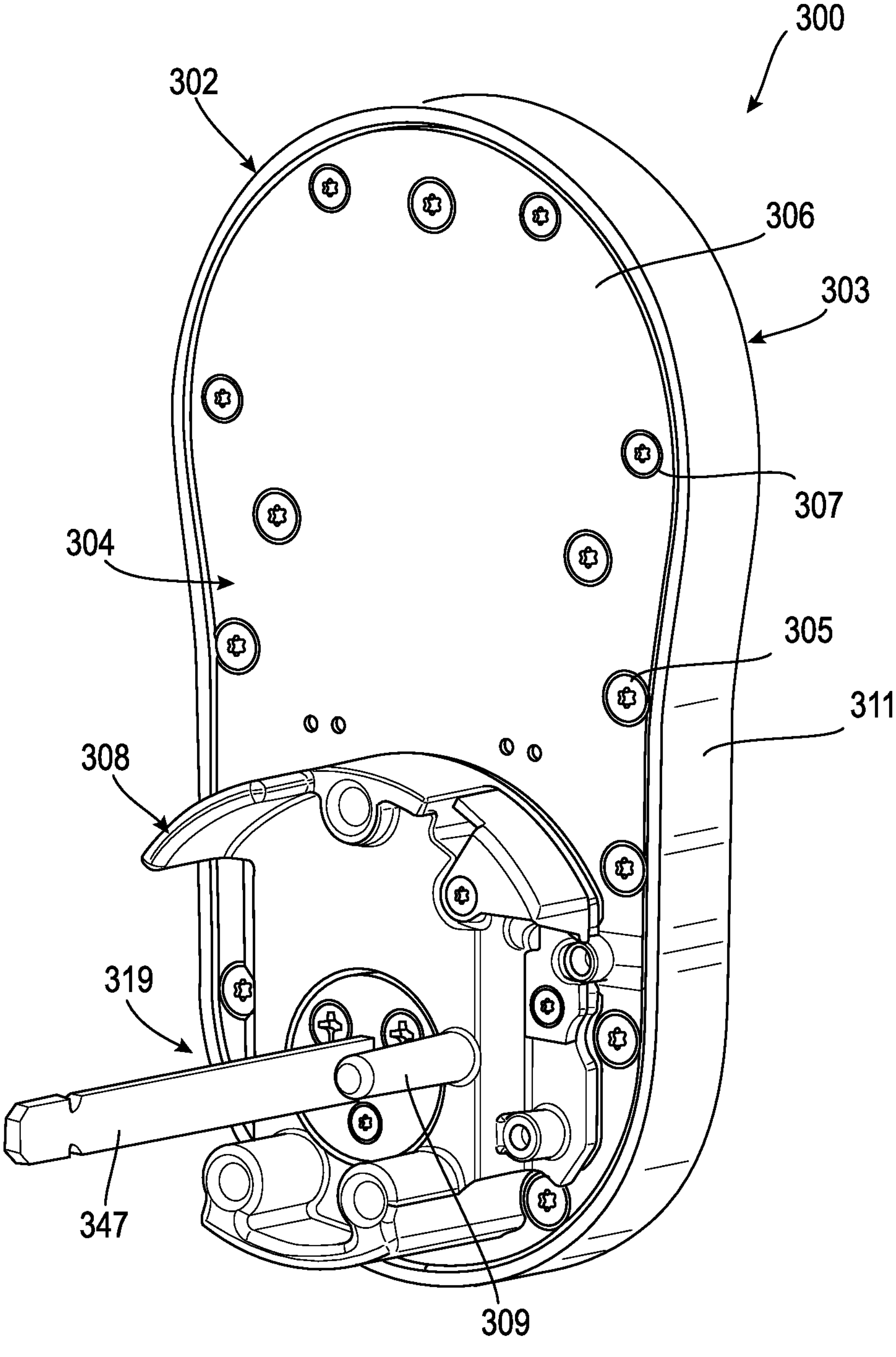
FIGS. 16A-16B are perspective views of a lock according to embodiments of the present disclosure.
Figure 16B:
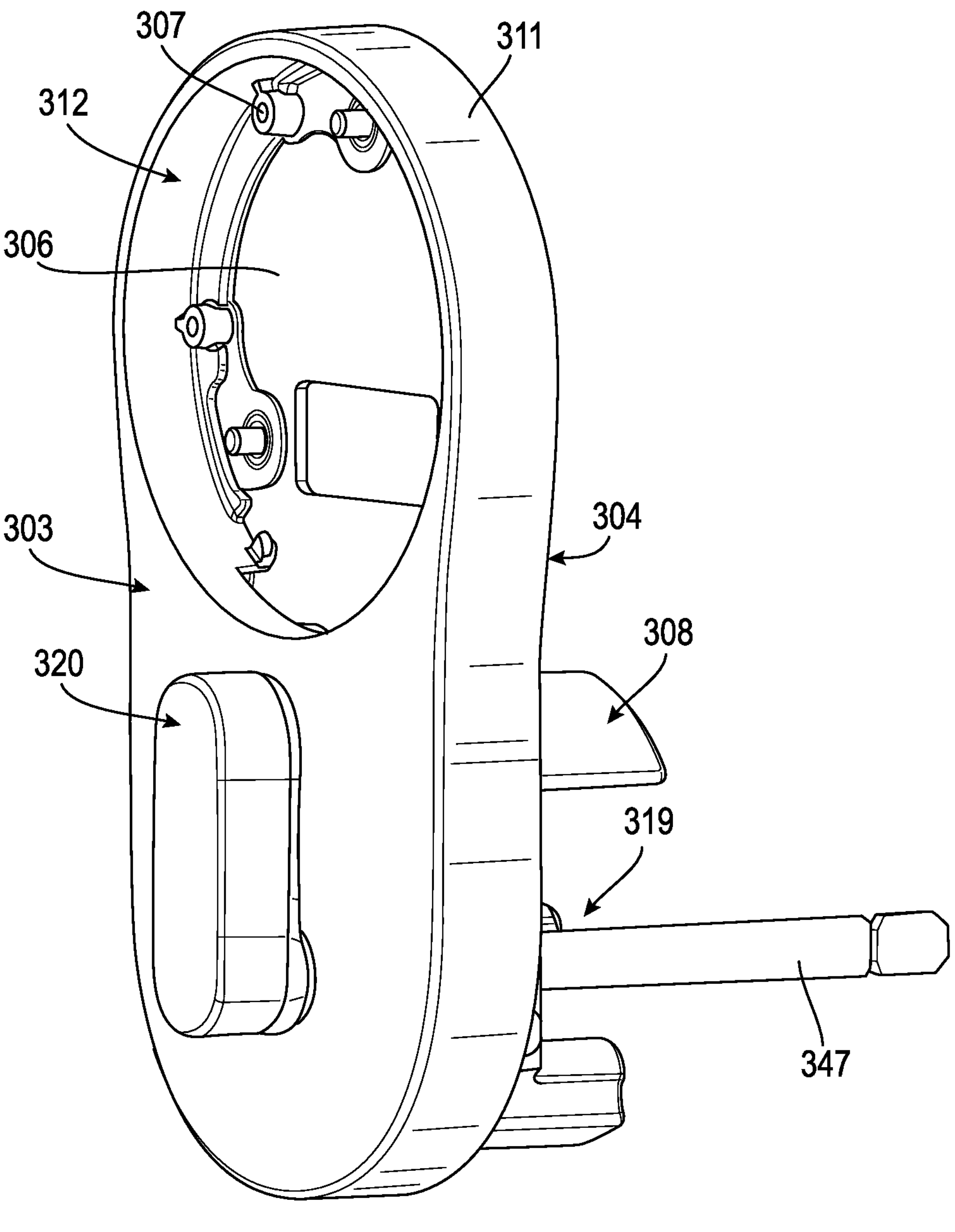
Figure 16C:
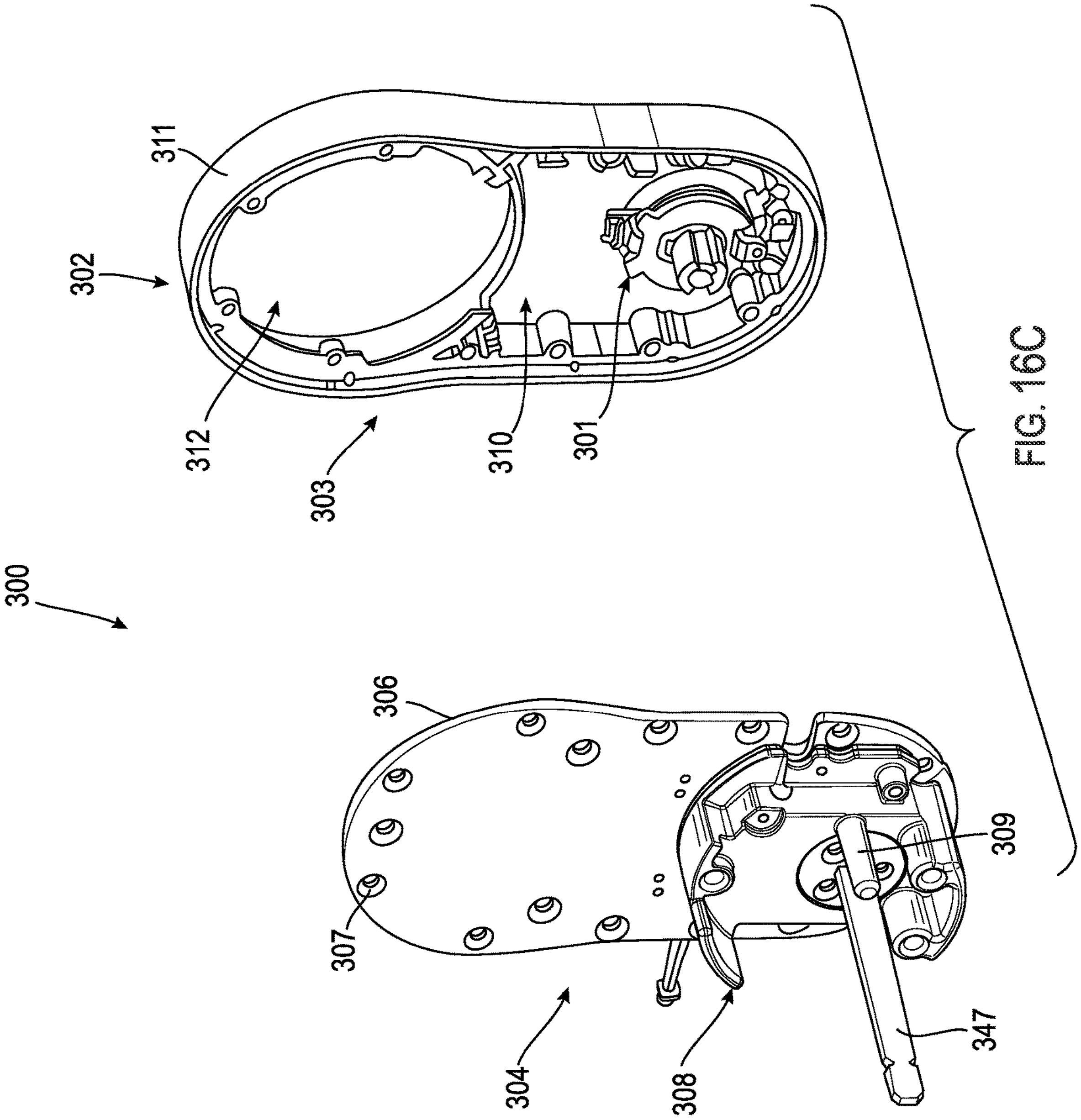
FIG. 16C is a partially exploded perspective view of the lock according to embodiments of the present disclosure.

FIGS. 16A-16C show a locking mechanism (hereinafter "lock") 300 according to another embodiment of the present disclosure. The lock 300 may be similar to the lock 100 described above. As such, only certain aspects of the lock 300 will hereinafter be described for the sake of brevity. As shown, the lock 300 may include a housing 302 defined, in part, by a front plate assembly 303 and a back plate assembly 304. The front plate assembly 303 and the back plate assembly 304 may be secured together by one or more fasteners 305 (e.g., screws) extending through openings 307 of a back plate 306 of the back plate assembly 304. The back plate assembly 304 may further include a door channel housing 308 and one or more pins 309 extending from the back plate 306. Although not shown, the door channel housing 308 is configured to extend through an opening provided between an interior and exterior side of a door. The front plate assembly 303 may include a main cavity 310 defined by a perimeter wall 311, and an opening 312 for receiving an interface (not shown). Within the main cavity may be a portion of a thumbturn assembly 301, while a thumbturn 320 is positioned on an exterior side of the door once the lock 300 is assembled. The thumbturn 320 may be connected with a main hub assembly 319 including a tailpiece 347 coupled to a deadbolt (not shown).

Figure 17:
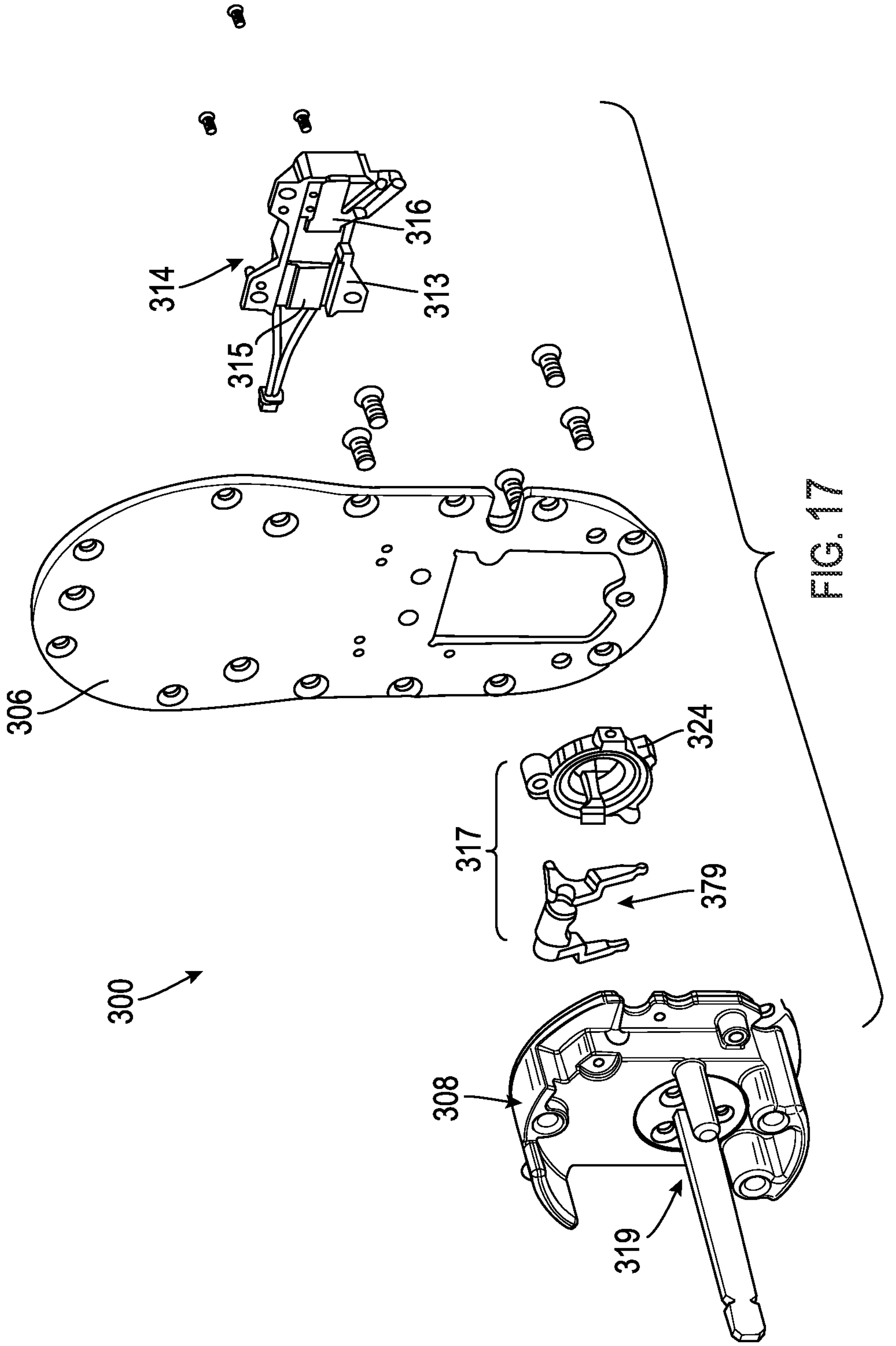
FIG. 17 is an exploded perspective view of the lock according to embodiments of the present disclosure.

FIG. 17 shows an exploded view of the lock 300 according to embodiments of the present disclosure. The lock 300 may include an actuator assembly 314 coupled to the back plate 306 by an actuator housing 313. The actuator assembly 314 may include an electronic actuator 315 operably connected with a carriage 316, which is operably connected with a clutch assembly 317 through an opening of the back plate 306. The clutch assembly 317 is further coupled to the main hub assembly 319, wherein linear translation of the clutch assembly 317 can cause engagement with the main hub assembly 319, which in turn causes a connection between the thumbturn and deadbolt. As shown, the clutch assembly 317 may include a linkage 379 coupleable with a driver plate 324.

Figure 18:
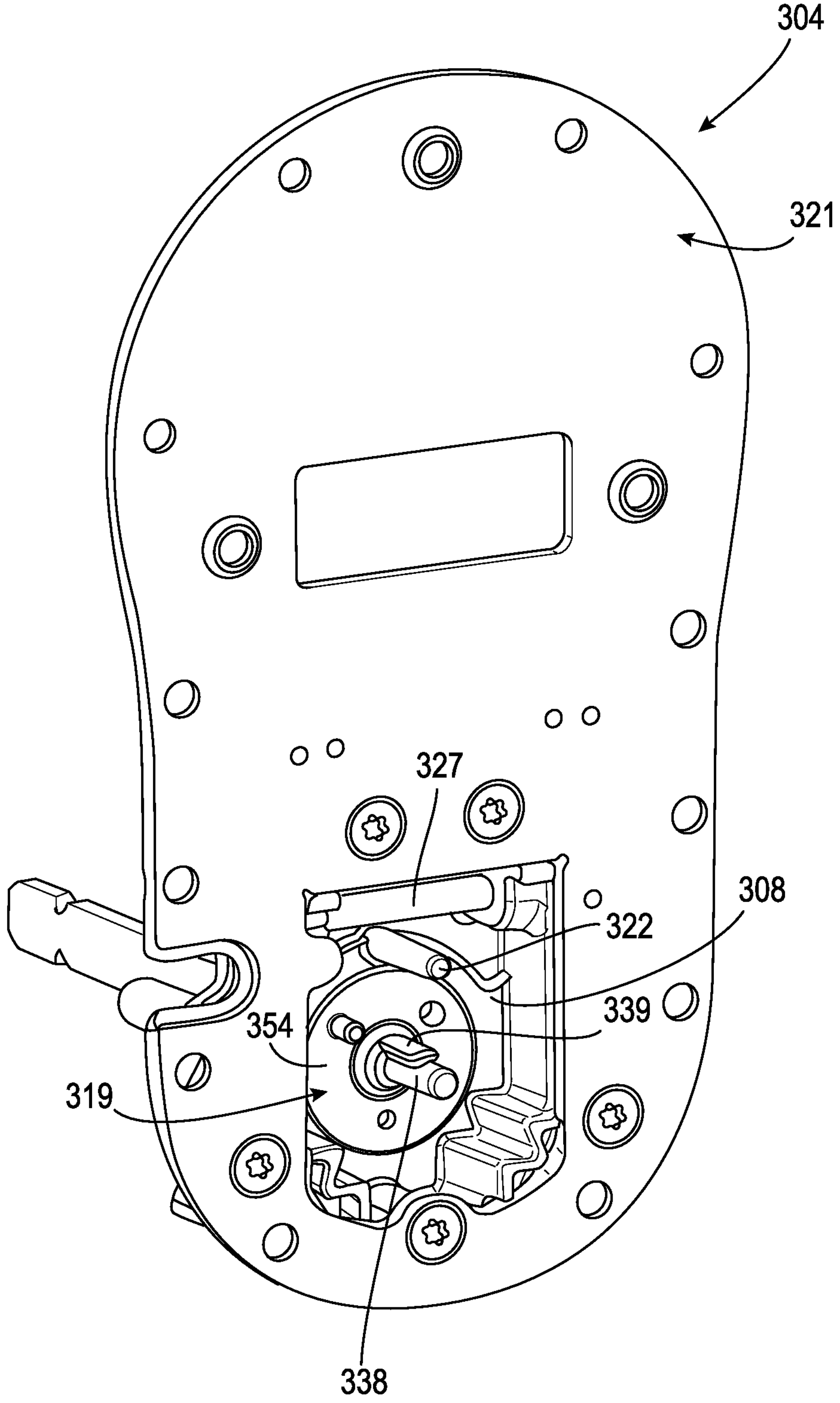
FIG. 18 depicts an internal side of a back plate assembly of the lock according to embodiments of the present disclosure.

FIG. 18 shows an internal side 321 of the back plate assembly 304 according to embodiments of the present disclosure. As shown, the door channel housing 308 may include one or more pins 322 operable to support the clutch assembly 317 and a cross support 327 to support a linkage of the clutch assembly 317. A central opening through the door channel housing 308 receives the main hub assembly 319. In some embodiments, the main hub assembly 319 may include a hub shaft 338 including a hub tab 339 extending from a hub wall 354. As will be described in greater detail herein, the hub tab 339 may engage the thumbturn assembly 301 to provide rotational engagement between the main hub assembly 319 and the thumbturn 320.

Figure 19:
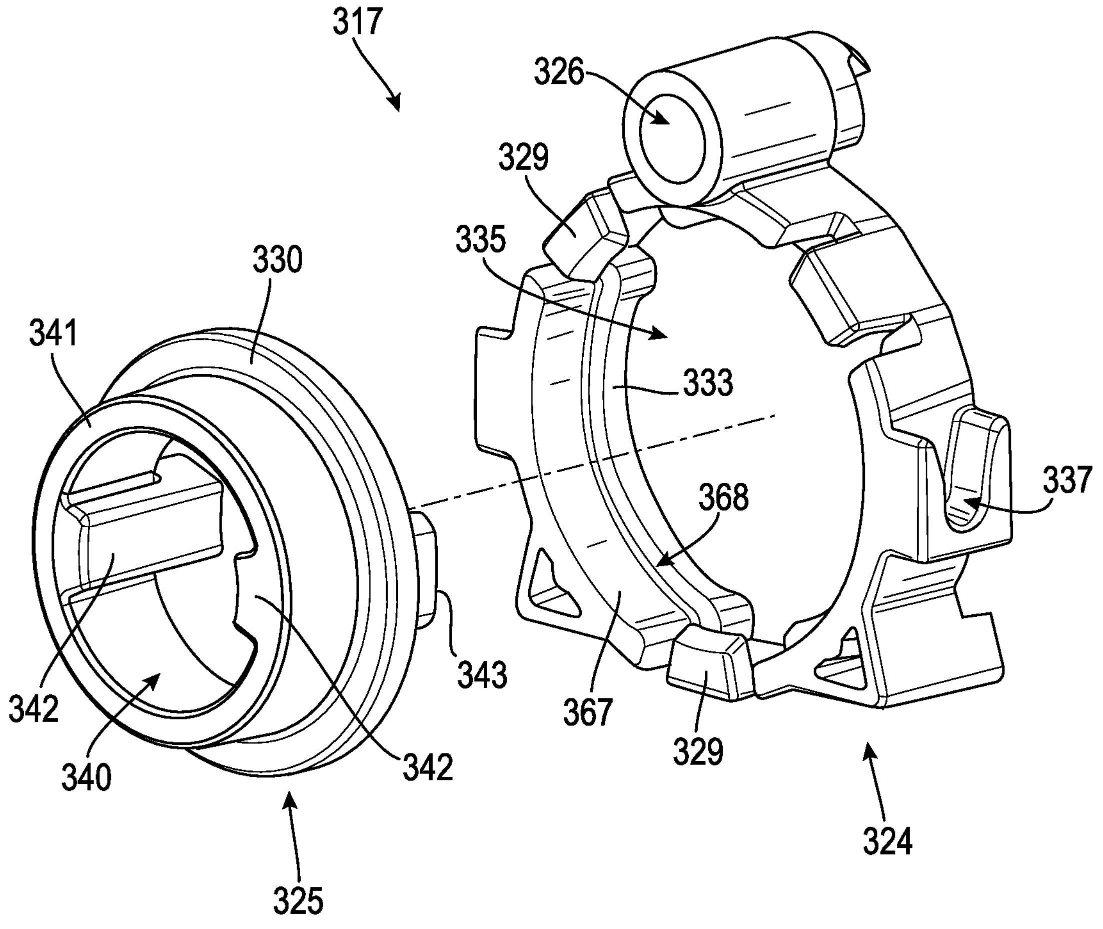
FIG. 19 is an exploded perspective view of a clutch assembly according to embodiments of the present disclosure.

FIG. 19 shows an exploded view of the clutch assembly 317 according to embodiments of the present disclosure. As shown, the clutch assembly 317 includes the driver plate 324 and an actuator plate 325. The driver plate 324 may include a channel opening 326 for receiving the pin 322 (FIG. 18) of the door channel housing 308. In some embodiments, the driver plate 324 may include a pair of receptacles 337 for receiving the linkage 379, as will be described in greater detail below.

The driver plate 324 may include a plate wall 367 and a plate channel 368. The plate wall 367 may include one or more snap-fit features 329, which interface with the actuator plate 325. The snap-fit features 329 may engage with a flange 330 of the actuator plate 325 to prevent disengagement of the actuator plate 325 from the driver plate 324, while still allowing the actuator plate 325 to rotate freely within the driver plate 324, for example, within the plate channel 368. A ridge 333 may engage with the actuator plate 325 to prevent the actuator plate 325 from moving farther into an opening 335 of the driver plate 324.

In some embodiments, the actuator plate 325 may include a central opening 340 defined by a cylinder wall 341 extending from the flange 330. Along an interior of the cylinder wall 341 is one or more engagement protrusions 342 extending radially inwards. In some embodiments, an end portion 343 of the engagement protrusions 342 extends past the ridge 333 of the driver plate 324 when the actuator plate 325 and the driver plate 324 are coupled together. During use, the central opening 340 of the actuator plate 325 may receive a hub shaft (not shown) of the main hub assembly 319.

Figure 20:
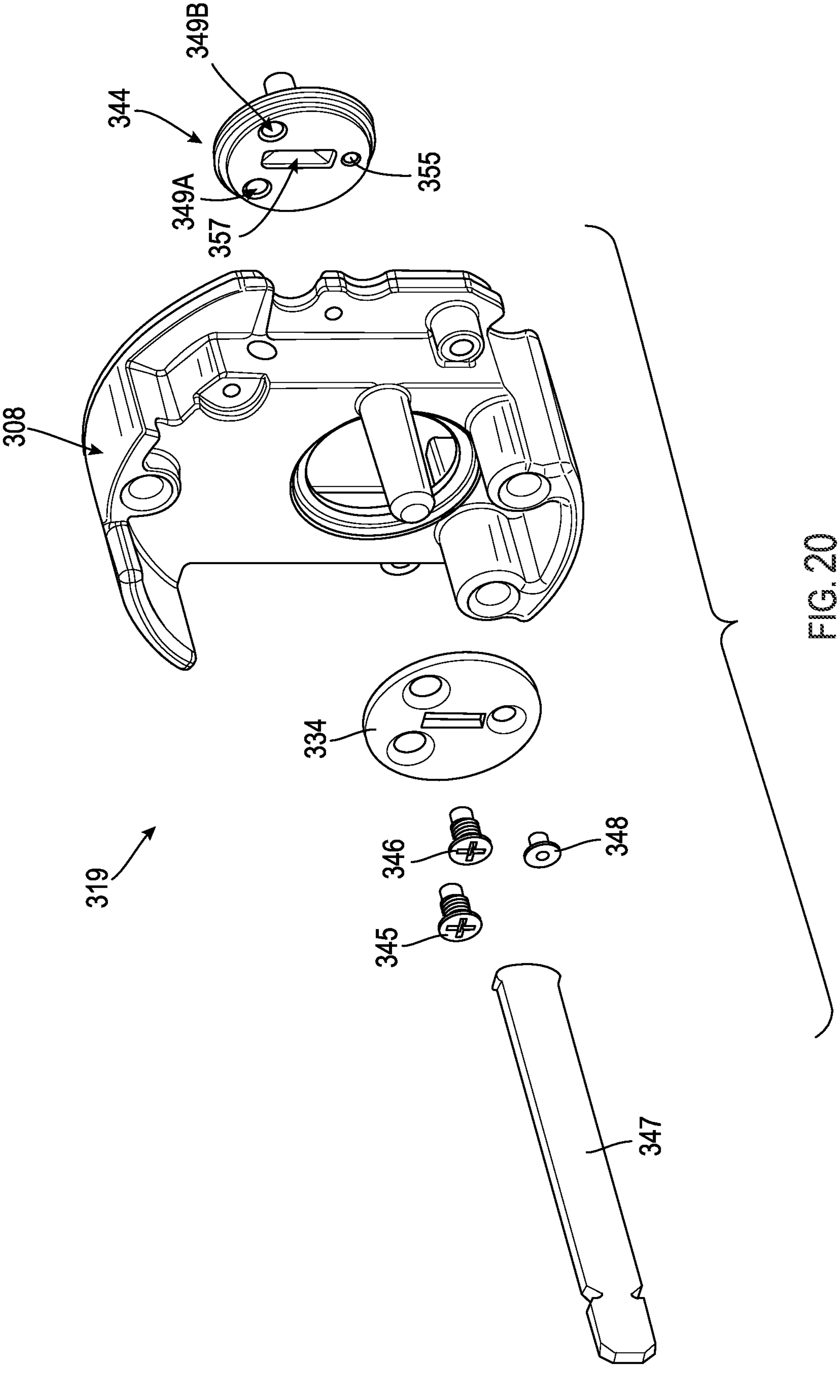
FIG. 20 is an exploded perspective view of a main hub assembly according to embodiments of the present disclosure.

FIG. 20 shows an exploded view of the main hub assembly 319 in greater detail. The main hub assembly 319 may include a tailpiece hub 344, a first screw 345, a second screw 346, the tailpiece 347, and a fastener 348. The fastener 348 may pass through a hub fastener opening 355 of the tailpiece hub 344 to connect the tailpiece 347 to the tailpiece hub 344 once the tailpiece 347 is inserted into a hub slot 357 of the tailpiece hub 344. As shown, the main hub assembly 319 may further include a retainer plate 334, which also includes a set of openings to receive, respectively, the first screw 345, the second screw 346, the fastener 348, and the tailpiece 347. Other fastening mechanisms such as screws, bolts, glue, press-fit tabs, or other fasteners can also be used. Embodiments herein are not limited in this context.

The first and second screws 345, 346 may thread into corresponding first and second holes 349A, 349B of the tailpiece hub 344. Pins or other types of hardware can also be used instead of threaded screws. The lock 300 may be initially provided with both the first and second screws 345, 346. During installation, either the first screw 345 or the second screw 346 can be removed to configure the lock 300 for a right-hand (RH) or left-hand (LH) door. For example, when the first screw 345 is present within the first hole 349A, counterclockwise rotation for a LH door is enabled. Meanwhile, when the second screw 346 is present within the second hole 349B, clockwise rotation for a RH door is enabled.

Figure 21:
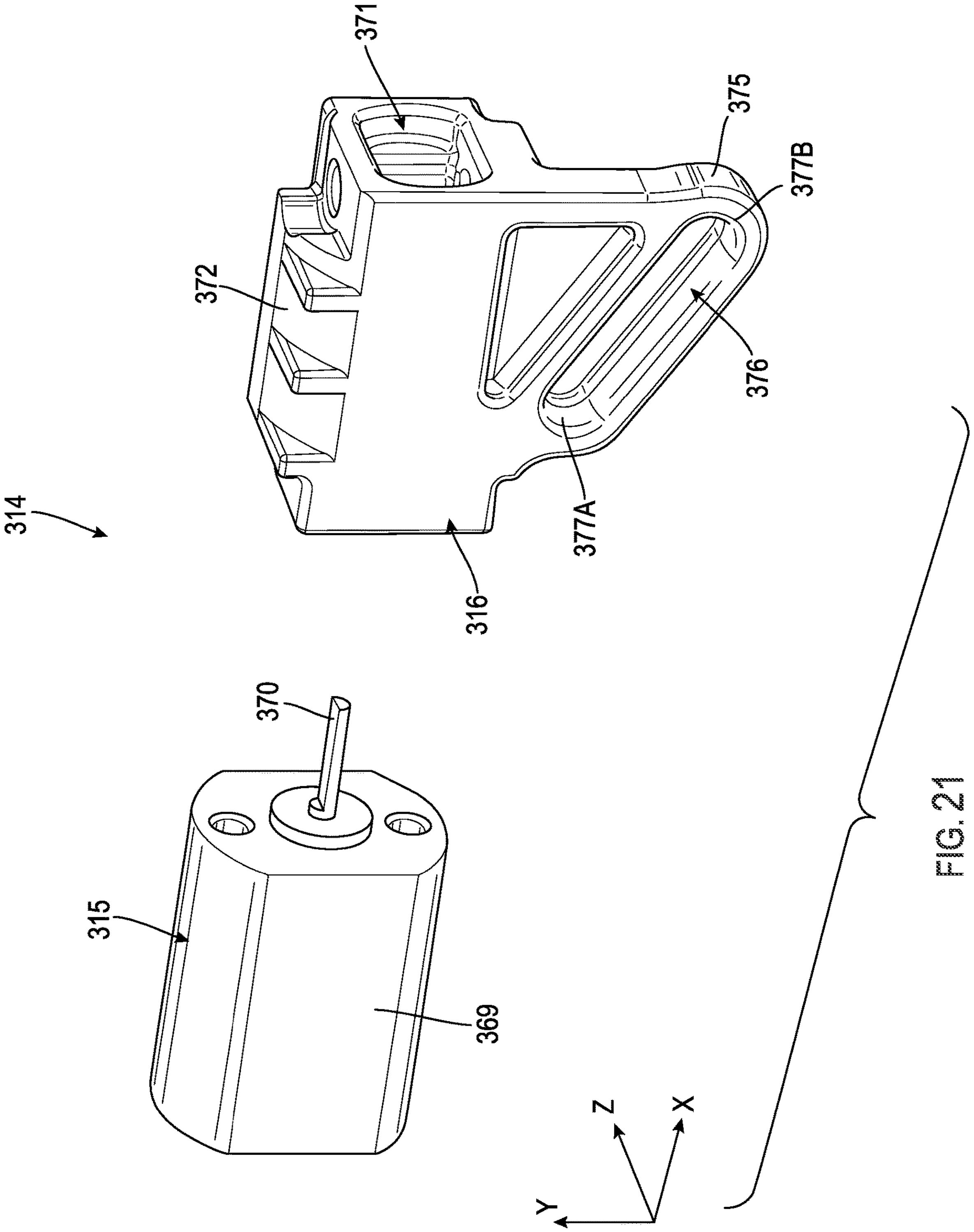
FIG. 21 is an exploded perspective view of an actuator assembly according to embodiments of the present disclosure.

FIG. 21 shows an exploded view of the electronic actuator 315 and carriage 316 of the actuator assembly 314. In some embodiments, the electronic actuator 315 includes an actuator body 369 and an actuator pin 370 extending from the actuator body 369. The actuator pin 370 may extend within a carriage opening 371 of a carriage body 372 of the carriage 316. In some embodiments, the actuator pin 370 is fixed or detachably coupled to the carriage body 372 so that the electronic actuator 315 can bias the carriage body 372 along the x-direction when energized.

As further shown, the carriage 316 may include a carriage arm 375 extending from the carriage body 372. Although non-limiting, the carriage arm 375 may generally extend vertically (e.g., along the y-direction) beneath the carriage body 372. In some embodiments, the carriage arm 375 may include a carriage slot 376 having a first end 377A and a second end 377B. The carriage slot 376 is sloped or slanted in the x-y plane such that the first end 377A is higher than the second end 377B.

Figure 22A:
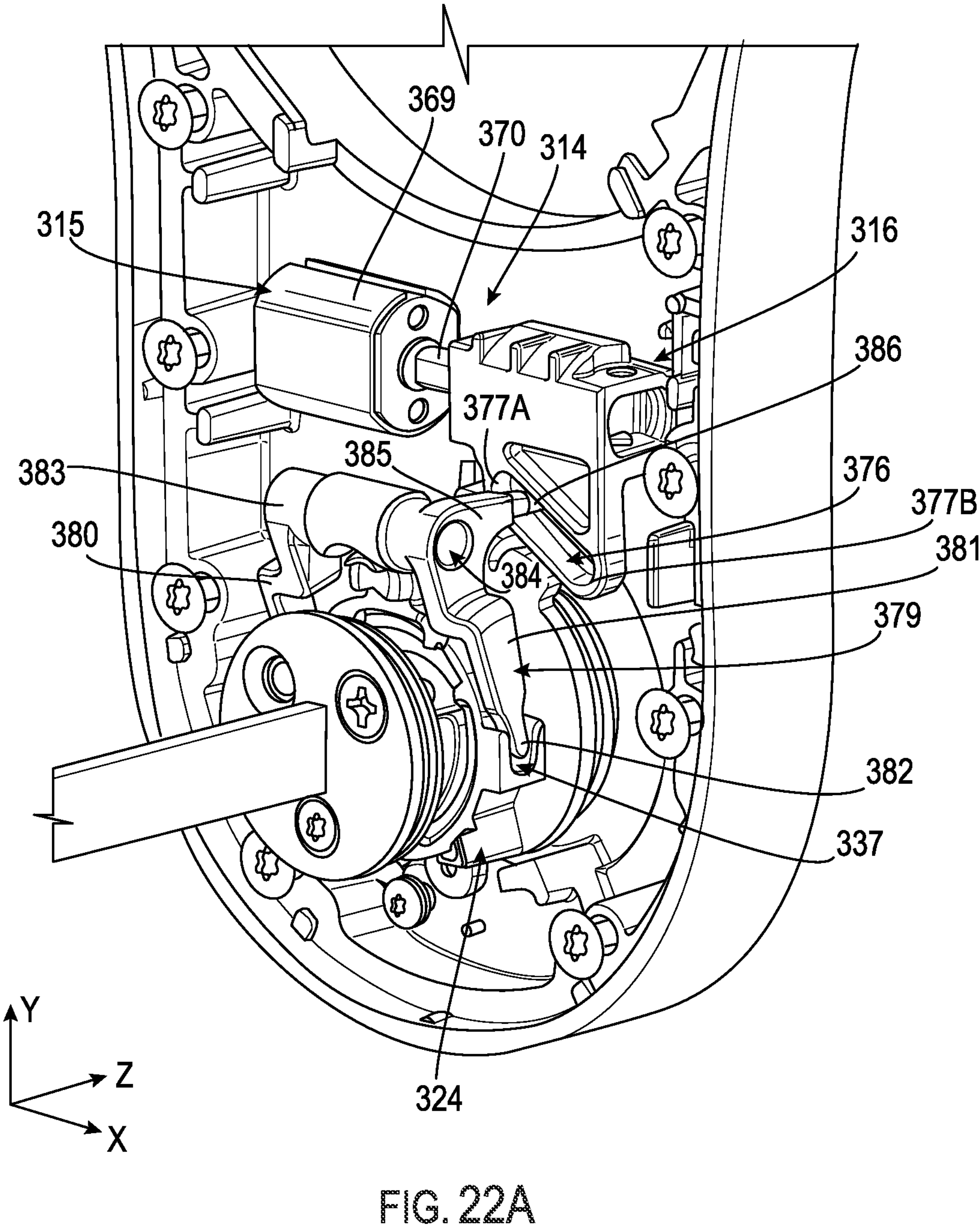
FIGS. 22A-22B are perspective views of the actuator assembly and the clutch assembly according to embodiments of the present disclosure.
Figure 22B:
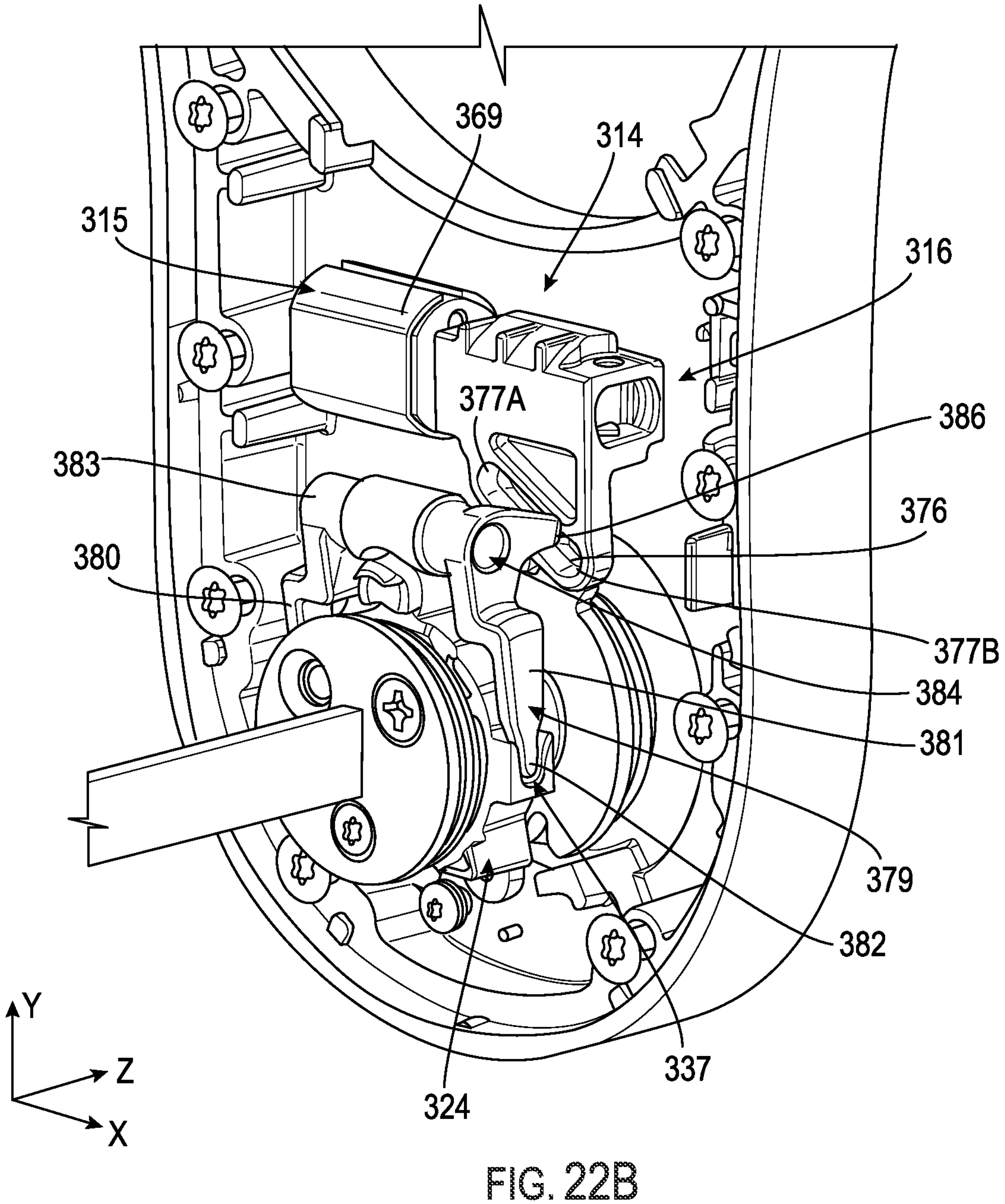

FIGS. 22A-22B demonstrate connection between the clutch assembly 317, the linkage 379, and the actuator assembly 314. In this embodiment, the linkage 379 may include a first leg 380 and a second leg 381 straddling the driver plate 324. A first end (not shown) of the first leg 380 and a first end 382 of the second leg 381 are received within respective receptacles 337 of the driver plate 324. In some embodiments, the first and second legs 380, 381 are fitted within the receptacles 337 of the driver plate 324. In other embodiments, the first and second legs 380, 381 are secured within the receptacles 337 by one or more fasteners. The first and second legs 380, 381 may be joined by a linking element 383 having an opening 384 for receiving the cross support 327 (FIG. 18) therein. The linkage 379 may further include a lever arm 385 extending from the second leg 381. A tip 386 of the lever arm 385 may extend within the carriage slot 376 of the carriage 316.

As shown in FIG. 22B, during use, the electronic actuator 315 may pull the carriage 316 towards the actuator body 369 of the electronic actuator 315, for example, along the negative x-direction. As the carriage 316 moves, the lever arm 385 travels within the carriage slot 376 towards the second end 377B, which in turn pushes the clutch assembly 317 along an axis (e.g., z-axis) perpendicular to the direction of movement of the carriage 316. This causes the clutch assembly 317 to transition into a credentialed state from an uncredentialed state. In some embodiments, the first ends 382 of the first and second legs 380, 381 may pivot within the receptacles 337 as the linkage 379 moves.

Figure 23A:
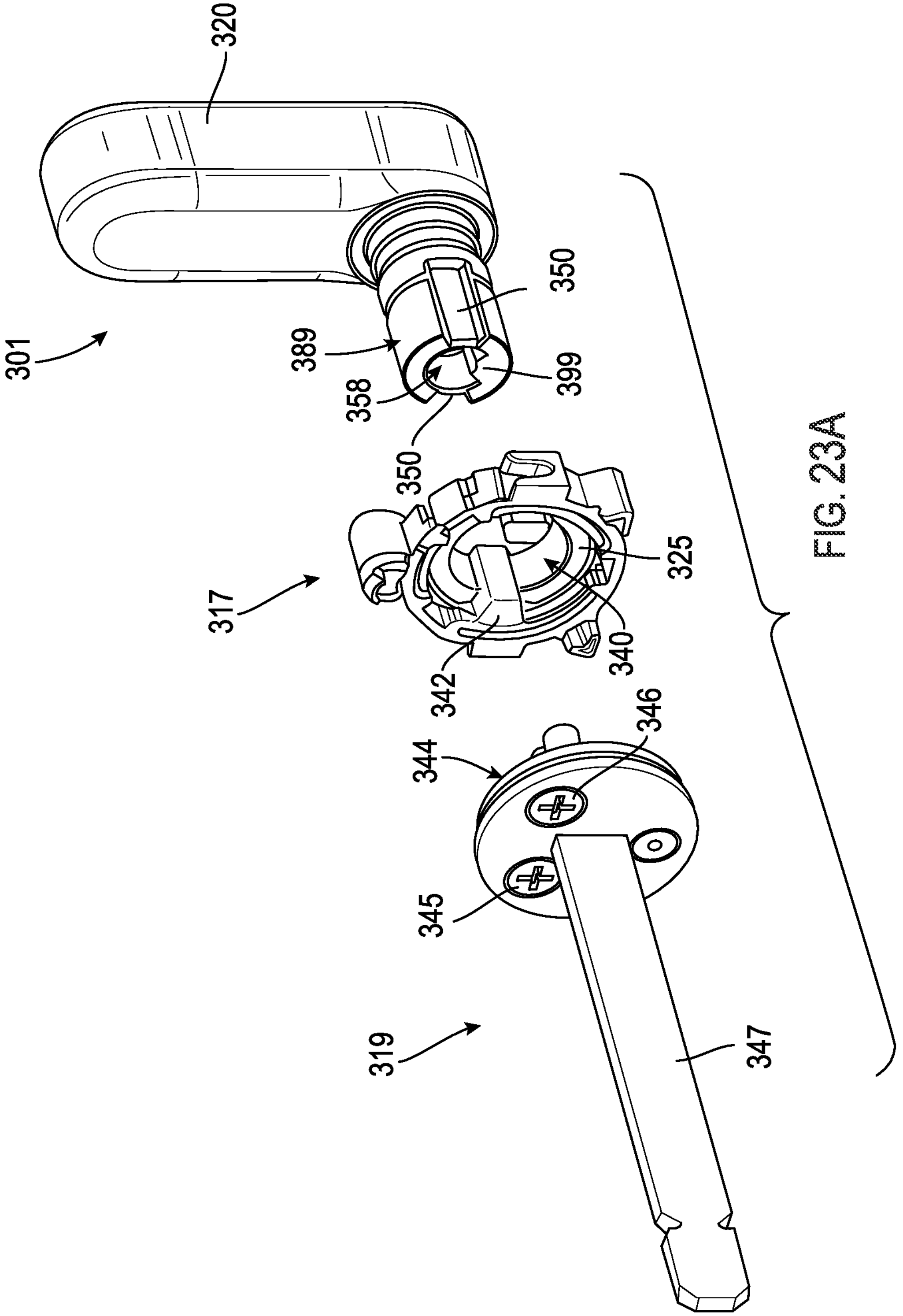
FIGS. 23A-23B are perspective views of the tailpiece hub, the clutch assembly, and a thumbturn assembly according to embodiments of the present disclosure.
Figure 23B:
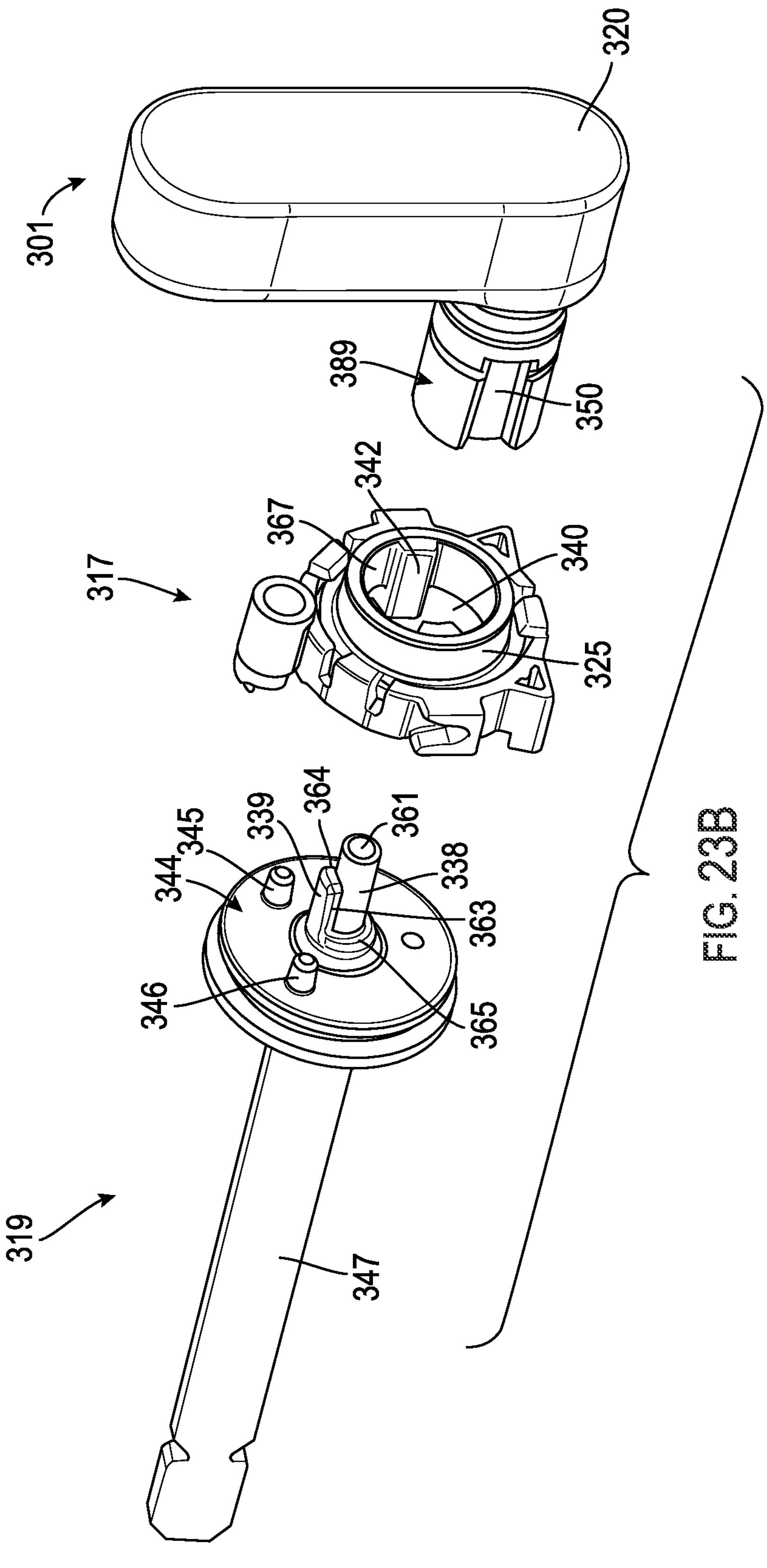

FIGS. 23A-23B illustrate alignment and engagement between the main hub assembly 319, the clutch assembly 317, and the thumbturn assembly 301 according to embodiments of the present disclosure. As shown, the thumbturn assembly 301 may include the thumbturn 320 extending from a shaft 389, wherein the shaft 389 includes one or more external slots 350 extending axially along an exterior of the shaft 389. When the shaft 389 is inserted through the central opening 340 of the actuator plate 325, the engagement protrusions 342 of the actuator plate 325 are received within the external slots 350 of the shaft 389. As a result, the thumbturn 320 is rotationally engaged with the clutch assembly 317.

When the tailpiece hub 344 of the main hub assembly 319 is inserted through the central opening 340 of the actuator plate 325, the hub shaft 338 and the hub tab 339 of the main hub assembly 319 are received within a shaft opening 358 of the shaft 389 of the thumbturn assembly 301. The shaft 389 may rotate about the hub shaft 338 until a locking tab 399 along an interior of the shaft 389 engages the hub tab 339. More specifically, the hub tab 339 may include a first engagement surface 363 and a second engagement surface 364 (FIG. 23B). As shown, the first and second engagement surfaces 363, 364 are circumferentially separated along, and may generally extend radially from, the hub shaft 338. A third engagement surface 365 may face a free end 361. In a credentialed or uncredentialed state, the deadbolt is unlocked, and rotation of the thumbturn 320 causes the hub tab 339 to rotate, which in turn causes the tailpiece 347 to rotate to lock the deadbolt.

Although both the first and second screws 345, 346 are shown, during use only one will be present. The first and second screws 345, 346 are configured to engage an inner surface of the plate wall 367 in an area above the engagement protrusions 342 when the lock is in a credentialed state. The actuator plate 325 will rotate until one of the engagement protrusions 342 meets the first screw 345 or the second screw 346, which will create rotational engagement therebetween (in a credentialed state). In an uncredentialed state, the handing first screw 345 or the second screw 346 does not contact the actuator plate 325.

Figure 24A:
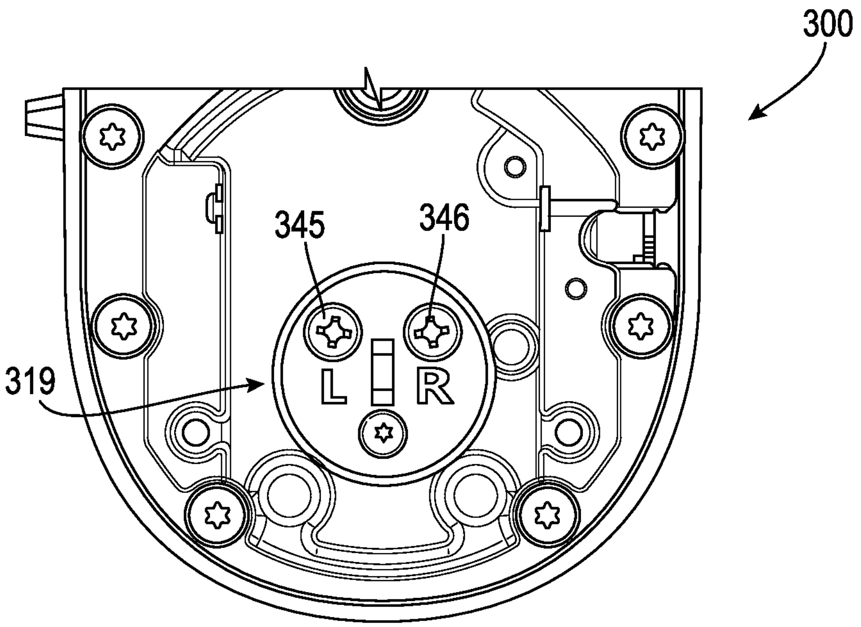
FIGS. 24A-24B are front and back views, respectively, of a field-swappable handing feature of the lock according to embodiments of the present disclosure.
Figure 24B:
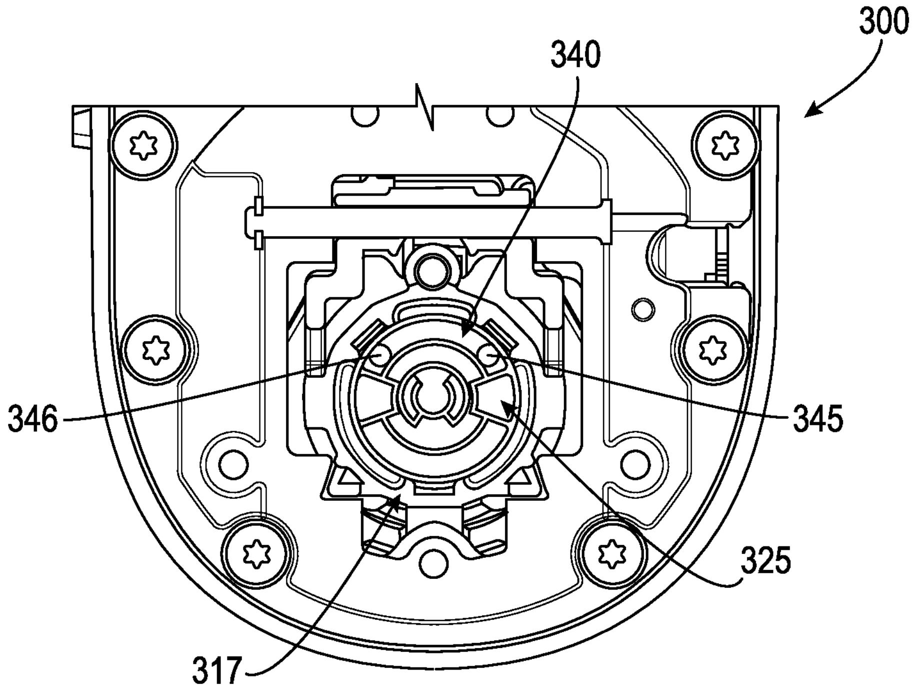

FIGS. 24A-24B further show the field-swappable handing feature of the lock 300 of the present disclosure. FIG. 24A shows an example back view of a portion of the main hub assembly 319, while FIG. 24B shows an example cross-section of the clutch assembly 317 engaging with the main hub assembly 319, according to some embodiments, depending on which screw is present. As noted above, the lock 300 can be provided with first and second screws 345, 346. In order to set the handing configuration during installation, one of the first and second screws 345 is inserted into the first hole 349A or the second hole 349B (shown in FIG. 20) during installation, which in turn causes the screw to project into the central opening 340. Similarly, the lock may be shipped with both first and second screws 345, 346 in place, wherein one of the first and second screws 345, 346 can be selectively removed prior to installation to achieve the same effect. In the example embodiment of FIGS. 24A-24B, only one screw is used to configure the lock 300 in a RH or LH mode.

Figure 25:
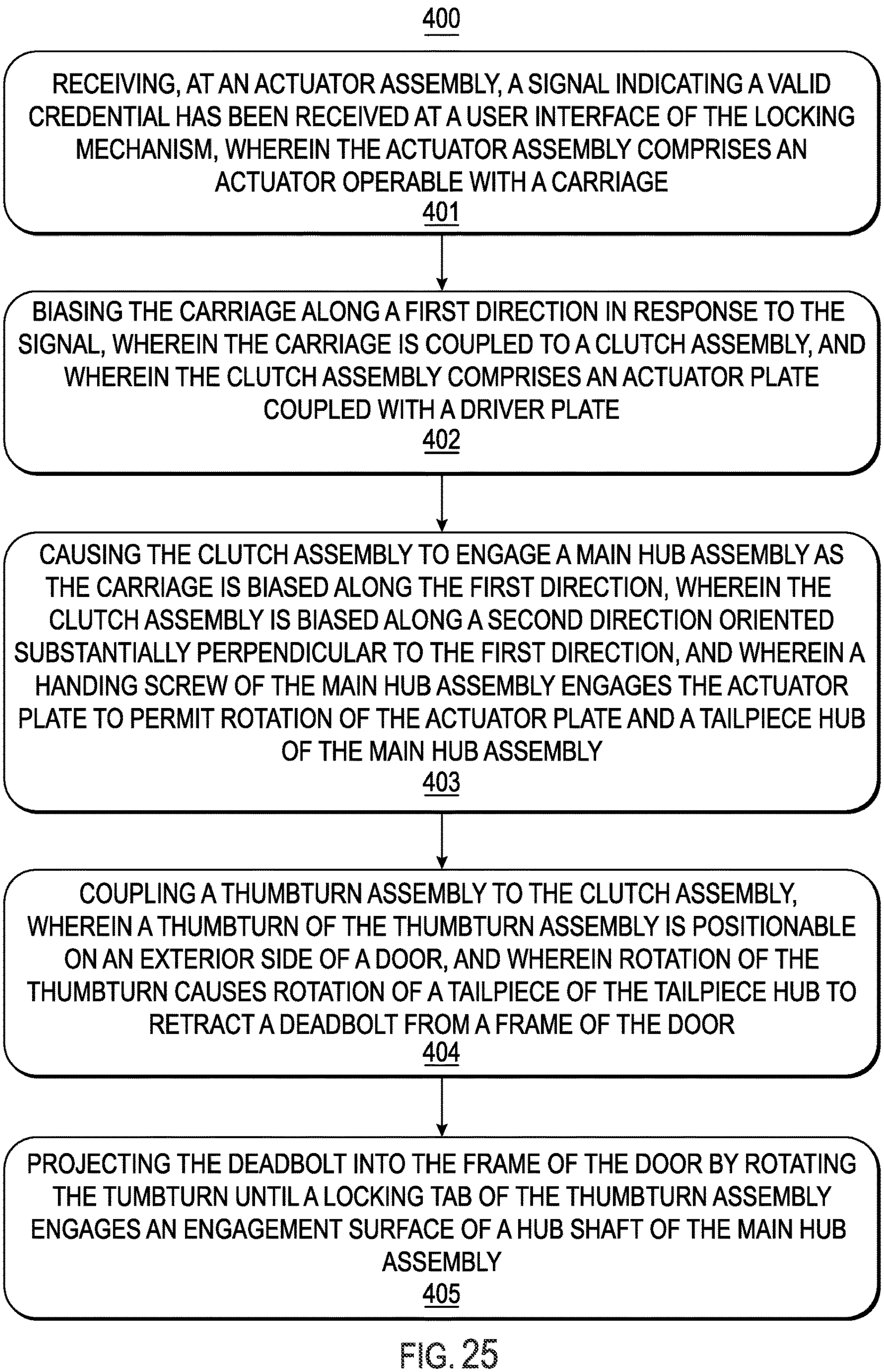
FIG. 25 depicts a flowchart of a method for operating a locking mechanism according to embodiments of the present disclosure.

Turning now to FIG. 25, a process flow diagram of a method 400 according to embodiments of the present disclosure is shown. At block 401, the method 400 may include receiving, at an actuator assembly, a signal indicating a valid credential has been received at a user interface of the locking mechanism, wherein the actuator assembly comprises an actuator operable with a carriage. At block 402, the method 400 may include biasing the carriage along a first direction in response to the signal, wherein the carriage is coupled to a clutch assembly, and wherein the clutch assembly comprises an actuator plate coupled with a driver plate. At block 403, the method 400 may include causing the clutch assembly to engage a main hub assembly as the carriage is biased along the first direction, wherein the clutch assembly is biased along a second direction oriented substantially perpendicular to the first direction. The actuator plate may engage the handing screw of the main hub assembly to permit rotation of the tailpiece hub of the main hub assembly. In exemplary embodiments, rotation is provided by the actuator plate, through the thumbturn, to rotate the main hub and actuate the deadbolt.

In some embodiments, the method 400 may include positioning a carriage pin within a channel of the driver plate, wherein the channel is positioned at an angle relative to a first main side and a second main side of the driver plate, and wherein the carriage pin moves between first and second ends of the channel as the carriage is biased along the first direction. In some embodiments, the method 400 may include coupling a linkage of the clutch assembly to a housing of the locking mechanism, and positioning a lever arm of the linkage within a slot of the carriage, wherein rotation of the linkage as the carriage is biased along the first direction causes the clutch assembly to move towards the main hub assembly.

At optional block 404, the method 400 may include coupling a thumbturn assembly to the clutch assembly, wherein a thumbturn of the thumbturn assembly is positionable on an exterior side of a door, and wherein rotation of the thumbturn causes rotation of a tailpiece of the tailpiece hub to retract a deadbolt from a frame of the door. At optional block 405, the method 400 may include projecting the deadbolt into the frame of the door by rotating the thumbturn until a locking tab of the thumbturn assembly engages an engagement surface of a hub shaft of the main hub assembly.

As stated above, the locks 100 and 300 described herein may be part of an access control system operable with at least one mobile device that is configured to communicate with the locks through wireless communication protocols, and a remote or access control cloud service constructed by the locks and the mobile device. The locks 100, 300 can be off-the-shelf, customized, or retro-fitted hardware devices, e.g., wireless sensors added to existing hardware or bolt on attachments for existing mechanical locks, that can be installed in various access points in a multi-unit building, including but not limited to the building entrance door, auxiliary entrance doors, auxiliary service doors, common room area doors, exercise room doors, individual unit doors, doors within units, and other relevant entrance points. Mobile devices can include smartphones, tablets, phablets, or other customized wireless communication-enabled devices that can communicate with the locks 100, 300 through a wireless local communication protocol, such as Bluetooth, Z-Wave, ZigBee, Thread, or other radio frequency (RF) communication network, etc. The mobile device can also store user credentials used for authenticating the user for access to the restricted area.

Although non-limiting, in some embodiments, the access control cloud service can connect the locks 100, 300 with the mobile devices to activate various functions, such as providing access to restricted areas until authentication is provided using a recognized credential. In some embodiments, a credential can be a digital file of lines of encrypted code. The credential can provide authentication and grant access to the user when it is paired with the user's mobile device. For example, the locks 100, 300 can grant access to a unit that can be owned or rented by a tenant that carries the mobile device, which stores the appropriate credential. When the user approaches his/her unit, the locks 100, 300 and user mobile device can wirelessly communicate to grant the user access, e.g., unlock the door, to the unit. Moreover, in some embodiments, a single credential can grant the user access to all buildings and establishments that implement the disclosed system. For example, the user can use the credential stored in his/her mobile device to access his/her office, gym, private club, or any area that has installed access control devices that can control access to secure areas. The user can conveniently manage all of his/her access needs through the same interface, e.g., an app running on his/her mobile phone or a website.

Persons of ordinary skill would understand that the disclosed systems, locks, and methods are enabled by the use of mobile devices and more specifically by the particular characteristics of mobile devices and how people interact with their mobile devices. For example, people carry a mobile device with them all the time. Mobile devices are most of the time turned on and can passively communicate with sensors in their environment without requiring the user's active engagement. Moreover, mobile devices have a wide variety of radio frequency communication capabilities, through built-in hardware, that make them ideal for communicating through different types of communication standards. Mobile devices can install and run applications or apps that enable functionality not available through a web browser operating on a computer, for example, by utilizing the devices' unique hardware attributes, such as radios, cameras, and secure biometric identifying sensors. In addition, mobile devices can be automatically updated in the background to provide updated secure keys, instructions, and permissions without requiring active user engagement.

According to embodiments of the invention, the access control cloud service obviates the need for a persistent internet connection. As discussed above, other prior art approaches require that access control devices are always connected to the internet. In contrast, the disclosed system can link access control devices with mobile devices through an access control cloud service. The mobile devices can provide a bridge to the internet for the entire mesh network. This allows operation of the access control system at low cost and with minimal power requirements, compared, for example, to a system that requires a persistent internet connection to operate and update the access control devices. In the described system, the access control devices can be connected to each other and the system can utilize the handshakes performed between user devices and access control devices to pass any system updates to the access control devices. User devices typically have internet connections and sufficient capacity to passively pass system update packets through the required handshake procedures with the installed access control hardware. Therefore, there is no additional requirement for a persistent internet connection installation just for the access control devices.

According to embodiments of the invention, the disclosed locks 100, 300 can have pre-installed keys, e.g., authentication information. These pre-installed keys can be installed into the locks at the factory, can be stored at the locks during installation, or can be periodically or sporadically updated. These keys can also be mirrored in a server, that can generate credentials for a user or a guest. This can enable the use of the locks, even when the locks are intermittently connected or not connected to the internet or a local area network. The mirrored keys on the server can generate the appropriate credentials that can grant access to an area that is controlled by the locks, based on the stored keys in the access control device.

As described herein, technical advantages of embodiments of the present disclosure may include a slim design in which mechanism and control fits entirely on the outside of the door, a physical connection to a standard deadbolt that provides the physical lock to the door, and the ability to lock the deadbolt, without requiring a valid credential, from an exterior side of the door by rotating the thumbturn and main hub assembly, which can allow an unauthenticated user to manually turn the thumbturn and lock the door. Further technical advantages of embodiments of the present disclosure include sensing of deadbolt position for fully extended and retracted positions ("locked" and "unlocked"), and sensing of external thumbturn deadbolt extension or retraction (e.g., to sense the difference between an external or internal lock or unlock). In some embodiments, sensing of external thumbturn deadbolt actuation is done using a magnetic sensor within the front plate assembly. For example, a magnet may be rotationally connected to the thumbturn, wherein a sensor positioned proximate the magnet detects changes in a magnetic field due to positional changes of the magnet.

Still further technical advantages of embodiments of the present disclosure may include integration of a standard interchangeable core within thumbturn, return to neutral thumbturn positioning, for example, using a spring return of an actuator, which prevents displaying position of deadbolt, and credentialed authentication for unlock (engagement of clutching mechanism) timeout. This feature can result in auto relock, or the ability to leave the locking mechanism in an 'armed' or 'credential approved' state for an intended period of time configurable by a user.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

As used herein, the terms "system" and "component" and "module" may be intended to refer to a computer-related entity, either hardware, a combination of hardware and software, software, or software in execution. For example, a component or module can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 400 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 400 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A locking mechanism, comprising:

a main hub assembly coupleable with a deadbolt;

a clutch assembly coupled to the main hub assembly;

an actuator assembly coupled to the clutch assembly, the actuator assembly comprising an actuator operable to bias a carriage along a first direction, in response to a wireless communications module within the housing detecting and determining that a valid credential has been received, to bring the clutch assembly and the main hub assembly closer to one another along a second direction, wherein the second direction is perpendicular to the first direction; and a thumbturn assembly coupled to the clutch assembly, the thumbturn assembly comprising a thumbturn positionable on an exterior side of a door;

the main hub assembly comprising a tailpiece hub, wherein the tailpiece hub comprises:

a main cylinder including a hub wall; and a hub shaft extending from the hub wall, wherein the hub shaft includes a first engagement surface and a second engagement surface, and wherein the first engagement surface and the second engagement surface are operable to engage a locking tab of the thumbturn assembly;

wherein the tailpiece hub further comprises a set of handing screws extending through the hub wall, wherein one of the set of handing screws is operable to engage an actuator plate of the clutch assembly when the clutch assembly is in a credentialed state.

2. The locking mechanism of claim 1, the thumbturn assembly comprising a pin hub within a shaft, wherein the shaft is connected to the thumbturn, and wherein the pin hub comprises:

a main body including the locking tab; and a tab extending axially from the main body, wherein the tab is operable to engage a keyed slot of the clutch assembly.

3. The locking mechanism of claim 2, the thumbturn assembly further comprising an interchangeable core within the thumbturn, wherein a set of pins of the pin hub extend within corresponding openings of the interchangeable core.

4. The locking mechanism of claim 3, the thumbturn assembly further comprising:

a stop plate coupled to the thumbturn; and a blocking ring operable to engage a projection of the stop plate to prevent rotation of the main hub assembly, wherein the thumbturn is configured to disconnect from the shaft when a force applied to the thumbturn when the blocking ring is engaged with the projection exceeds a threshold.

5. The locking mechanism of claim 1, the thumbturn assembly comprising a shaft including one or more external slots, wherein an engagement protrusion of the clutch assembly is received within the external slots.

6. The locking mechanism of claim 1, the actuator plate comprising:

a first slot operable to receive a first screw of the set of handing screws;

a second slot operable to receive a second screw of the set of handing screws; and an opening adjacent the first and second slots, the opening operable to receive the hub shaft of the tailpiece hub, wherein when the first screw is present within the first slot, rotation of the thumbturn to actuate the deadbolt is permitted in a first direction, and wherein when the second screw is present within the second slot, rotation of the thumbturn to actuate the deadbolt is permitted in a second direction, opposite the first direction.

7. The locking mechanism of claim 6, the opening of the actuator plate further including a keyed slot operable to receive a key shaft of a pin hub of the thumbturn assembly.

8. The locking mechanism of claim 6, the opening of the actuator plate defined by a cylinder wall including one or more engagement protrusions extending radially inwards, wherein the one or more engagement protrusions are operable to engage the set of handing screws during rotation between the tailpiece hub and a driver plate of the clutch assembly.

9. The locking mechanism of claim 8, wherein the driver plate includes a set of press-fit tabs engaged with the actuator plate.

10. The locking mechanism of claim 9, the driver plate comprising:

a first main side opposite a second main side;

an upper section between the first and second main sides; and a channel through the upper section, the channel operable to receive the carriage of the actuator assembly.

11. The locking mechanism of claim 10, the carriage of the actuator assembly comprising a carriage arm extending from a carriage body, wherein the carriage arm is movable within the channel of the driver plate.

12. The locking mechanism of claim 11, wherein the actuator is an electronic actuator movable in response to a signal indicating a valid credential has been received, wherein retraction of the electronic actuator causes the carriage arm to move between a first end of the channel and a second end of the channel to bring the clutch assembly and the tailpiece hub closer to one another along the second direction.

13. The locking mechanism of claim 12, wherein, when the clutch assembly and the tailpiece hub are engaged with one another, the first screw is inserted through the first slot or the second screw is inserted through the second slot.

14. The locking mechanism of claim 1, wherein the clutch assembly comprises a linkage coupled to the main hub assembly, the linkage comprising:

a first leg and a second leg; and a lever arm extending from one of the first leg or the second leg, wherein the lever arm is coupled to the carriage of the actuator assembly.

15. The locking mechanism of claim 14, wherein the carriage of the actuator assembly includes a carriage slot operable to receive the lever arm.

16. A method of operating a locking mechanism, comprising:

providing a main hub assembly comprising a tailpiece, wherein the tailpiece is coupleable with a deadbolt;

coupling a clutch assembly to the main hub assembly;

receiving, at an actuator assembly, a signal including credential, wherein the actuator assembly comprises an actuator operable with a carriage;

biasing, in response to a wireless communications module within the housing detecting and determining a valid credential has been received, the carriage along a first direction to bring the clutch assembly and the main hub assembly closer to one another along a second direction, wherein the second direction is perpendicular to the first direction;

coupling a thumbturn assembly to the clutch assembly, wherein a thumbturn of the thumbturn assembly is positionable on an exterior side of a door, and wherein rotation of the thumbturn causes rotation of the tailpiece to retract a deadbolt from a frame of the door; and engaging an actuator plate of the actuator assembly with a handing screw of the main hub assembly to permit rotation of the actuator plate and a tailpiece hub of the main hub assembly.

17. The method of claim 16, further comprising positioning the carriage within a channel of a driver plate of the clutch assembly, wherein the channel is positioned at an angle relative to a first main side and a second main side of the driver plate, and wherein the carriage moves between first and second ends of the channel as the carriage is biased along the first direction.

18. The method of claim 16, further comprising:

coupling a linkage of the clutch assembly to a housing of the locking mechanism; and positioning a lever arm of the linkage within a slot of the carriage, wherein rotation of the linkage as the carriage is biased along the first direction causes the clutch assembly to move towards the main hub assembly.

19. The method of claim 16, further comprising projecting the deadbolt into the frame of the door by rotating the thumbturn until a locking tab of the thumbturn assembly engages an engagement surface of a hub shaft of the main hub assembly.

20. A locking mechanism, comprising:

a main hub assembly coupled to a housing, the main hub assembly including a tailpiece coupleable with a deadbolt;

a clutch assembly coupled to the main hub assembly;

an actuator assembly coupled to the clutch assembly, the actuator assembly comprising an actuator operable to bias a carriage along a first direction in response to a signal to a wireless communications module within the housing detecting and determining that a valid credential has been received, wherein biasing the carriage along the first direction causes the carriage to move between first and second ends of a channel of the clutch assembly to bring the clutch assembly and the main hub assembly closer to one another along a second direction, and wherein the second direction is perpendicular to the first direction; and a thumbturn assembly coupled to the clutch assembly, the thumbturn assembly comprising a thumbturn positionable on an exterior side of a door;

the main hub assembly comprising a tailpiece hub, wherein the tailpiece hub comprises:

a main cylinder including a hub wall; and a hub shaft extending from the hub wall, wherein the hub shaft includes a first engagement surface and a second engagement surface, and wherein the first engagement surface and the second engagement surface are operable to engage a locking tab of the thumbturn assembly;

wherein the tailpiece hub further comprises a set of handing screws extending through the hub wall, wherein one of the set of handing screws is operable to engage an actuator plate of the clutch assembly when the clutch assembly is in a credentialed state.

* * * * *